United States Patent [19]

Eguchi et al.

[11] Patent Number: 5,295,025
[45] Date of Patent: Mar. 15, 1994

[54] CASSETTE DATA DETECTING APPARATUS OF SYSTEM FOR MOUNTING A PLURALITY OF CASSETTES

[75] Inventors: Naoki Eguchi; Akira Kawamura, both of Kumagaya, Japan

[73] Assignee: Kabushiki Kaisha Toshiba, Kawasaki, Japan

[21] Appl. No.: 847,688

[22] Filed: Mar. 6, 1992

[30] Foreign Application Priority Data

| Mar. 8, 1991 [JP] | Japan | 3-043771 |
| Mar. 8, 1991 [JP] | Japan | 3-043772 |

[51] Int. Cl.$^5$ .............................................. G11B 15/18
[52] U.S. Cl. ........................................ 360/71; 360/92; 360/60
[58] Field of Search ............... 360/92, 60, 74.6, 69, 360/96.5, 96.6, 71, 99.02

[56] References Cited

U.S. PATENT DOCUMENTS

| 4,706,141 | 11/1981 | Oba et al. | 360/96.5 |
| 4,809,115 | 2/1989 | Shibata et al. | 360/137 |
| 4,903,152 | 2/1990 | Matsui | 360/92 |
| 4,991,040 | 2/1991 | Fukuda et al. | 360/92 |
| 5,177,646 | 1/1993 | Lee | 360/60 |

*Primary Examiner*—Aristotelis Psitos
*Assistant Examiner*—James T. Wilson
*Attorney, Agent, or Firm*—Cushman, Darby & Cushman

[57] ABSTRACT

One end portion of a lug detecting lever or cassette detecting lever is arranged at the position of a safety lug of a cassette loaded on a tray unit or at the position of the cassette. The pivotal position of the other end portion of this detecting lever is varied in accordance with the presence/absence of a safety lug or a cassette. During insertion of the tray unit into a housing, a shutter mechanism is rendered operative or inoperative in accordance with the pivotal position of said detecting lever. The shutter mechanism is associated with a tape end detecting element. Upon receiving a detection signal from this tape end detecting element, a controller can determine the presence/absence of a safety lug or a cassette.

6 Claims, 19 Drawing Sheets

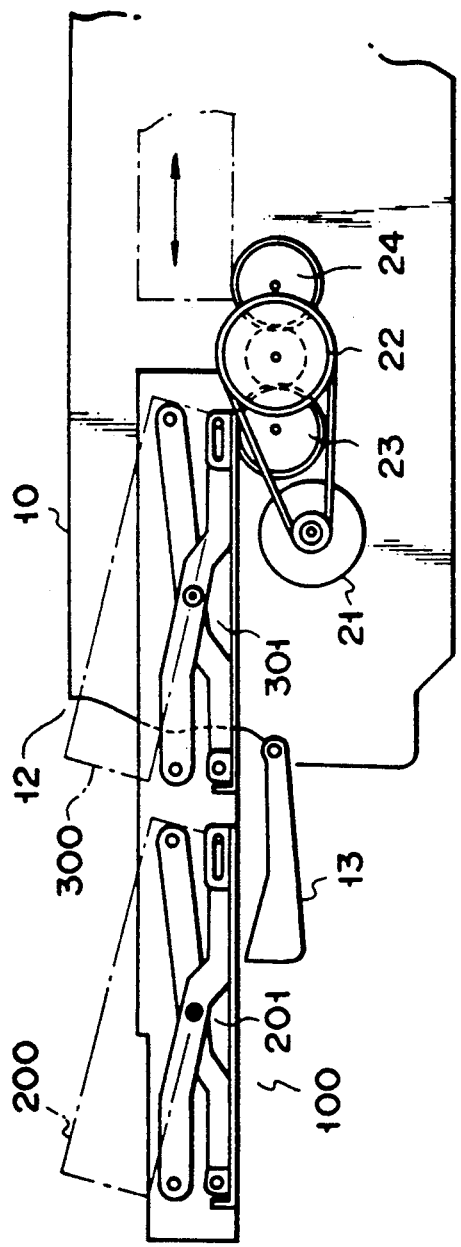
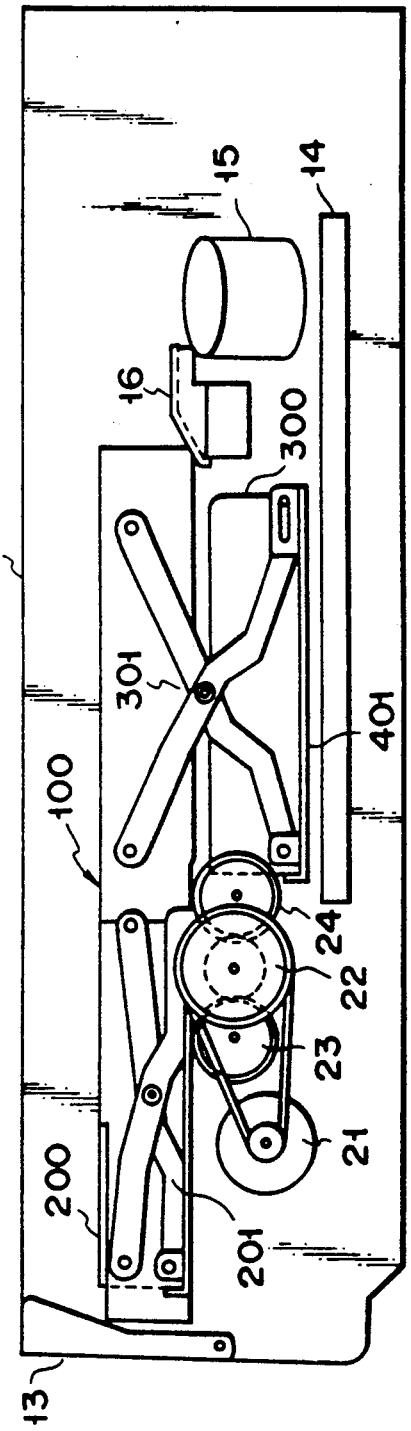
FIG. 6A
FIG. 6B

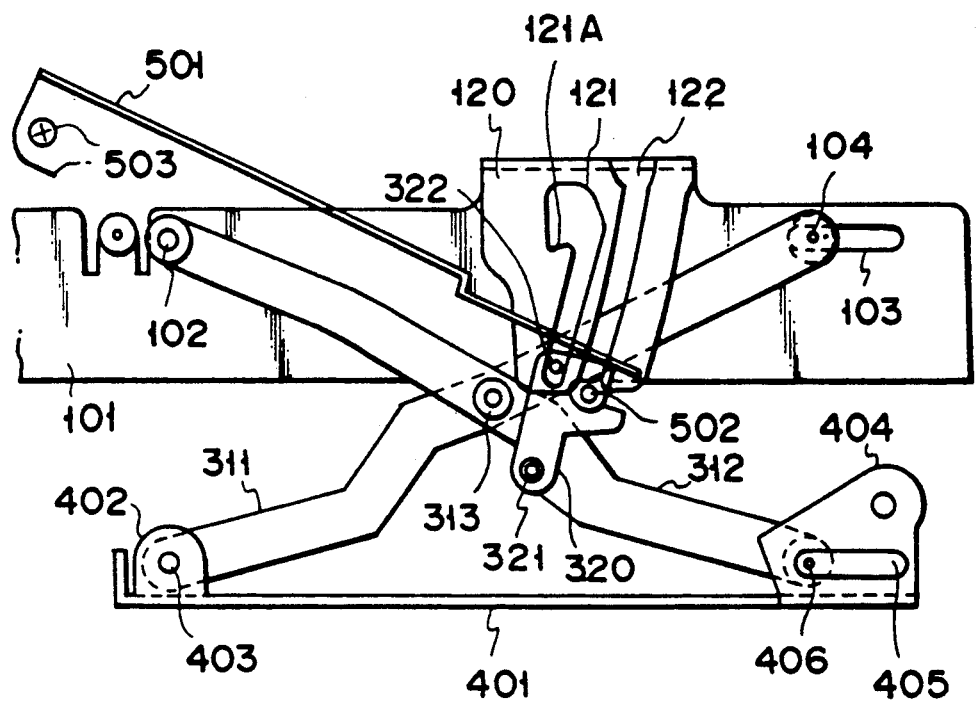
F I G. 7A
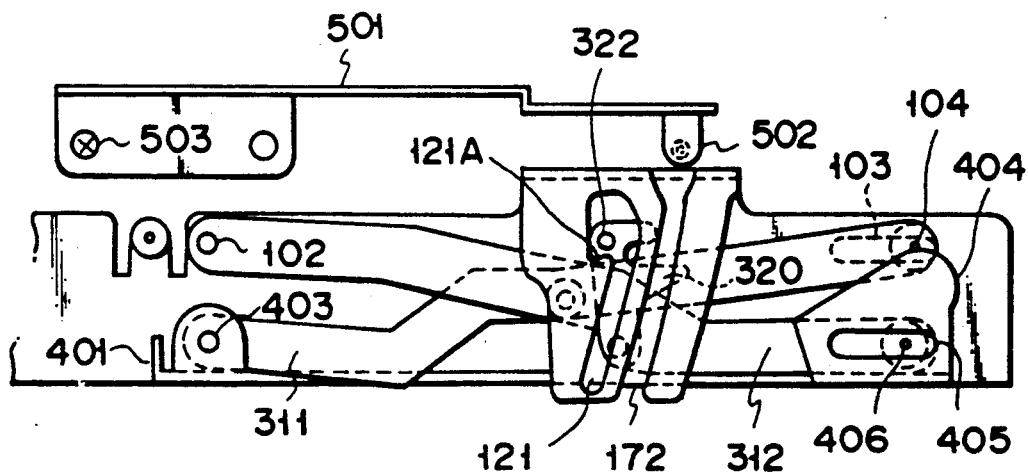
F I G. 7B

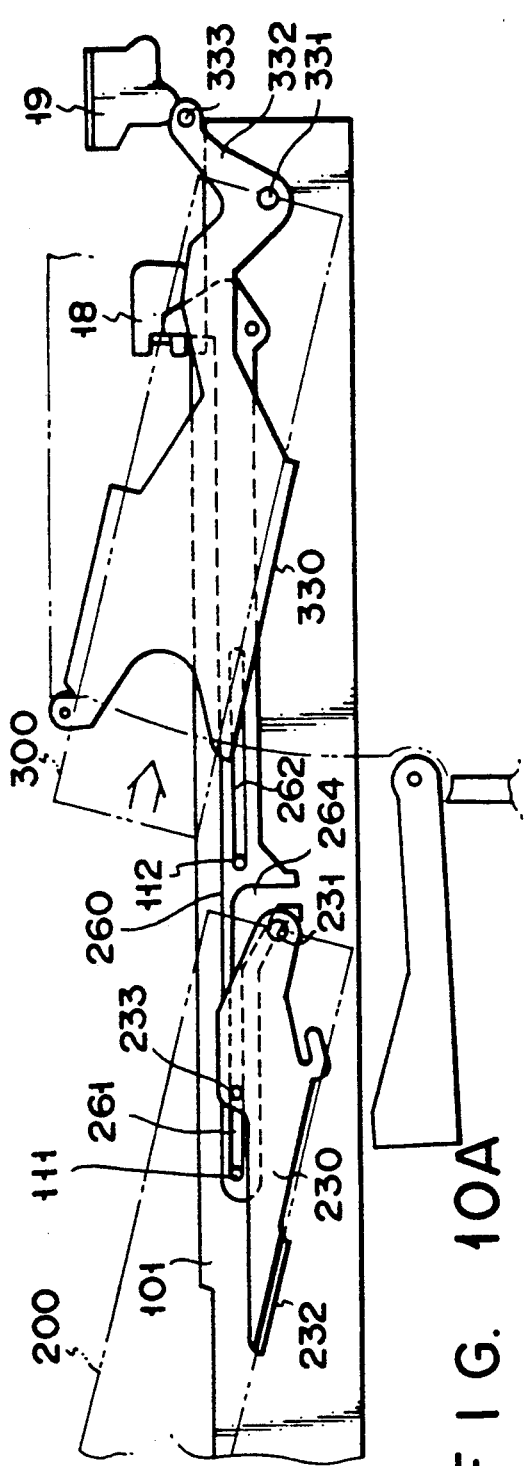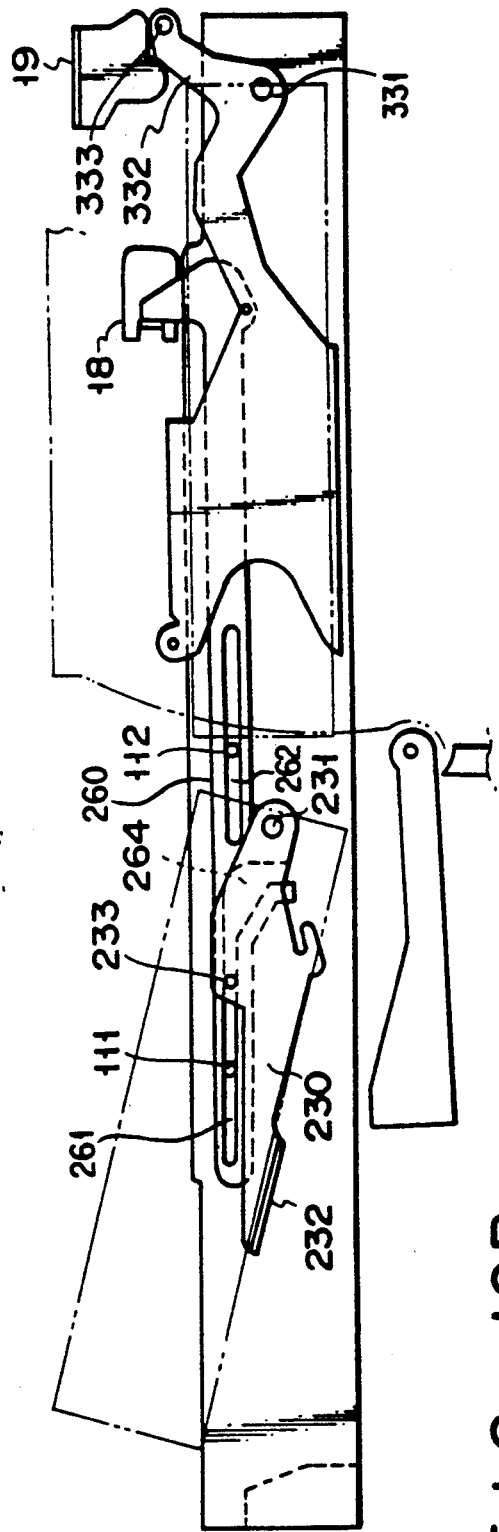
FIG. 10A
FIG. 10B

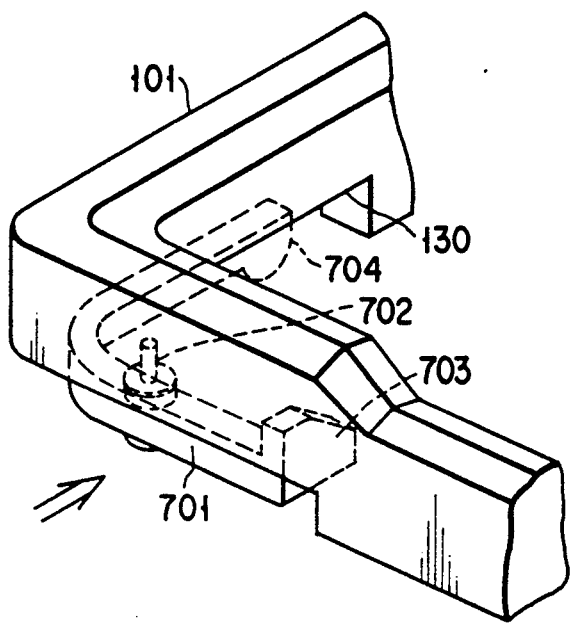
F I G. 12A
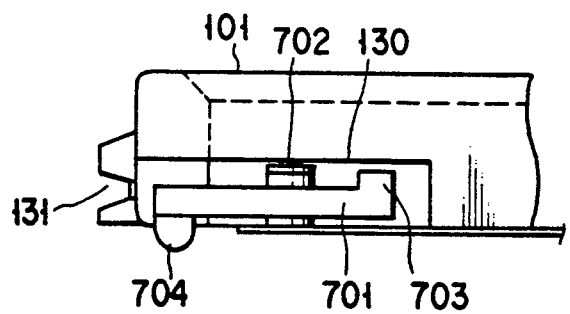
F I G. 12B

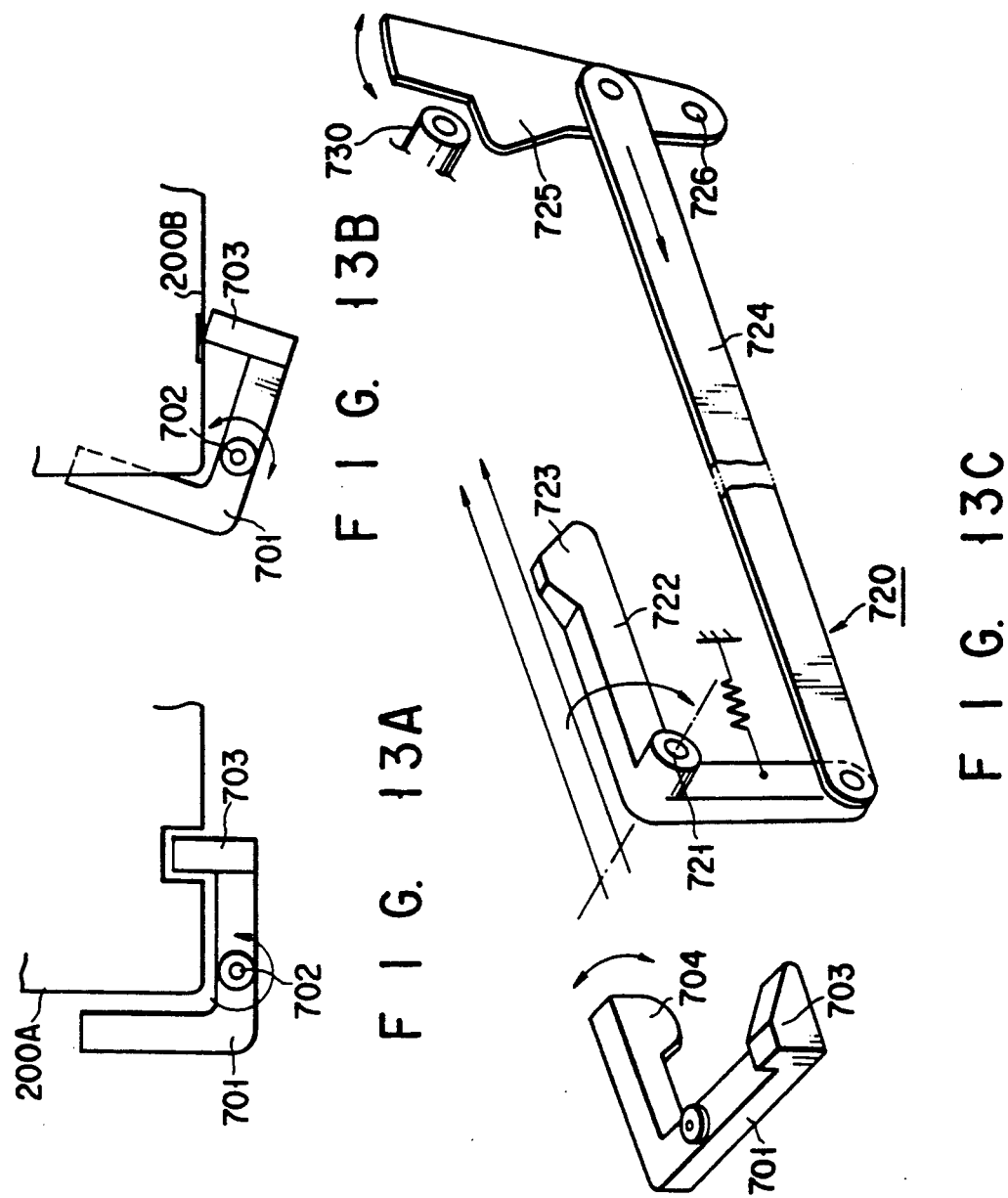

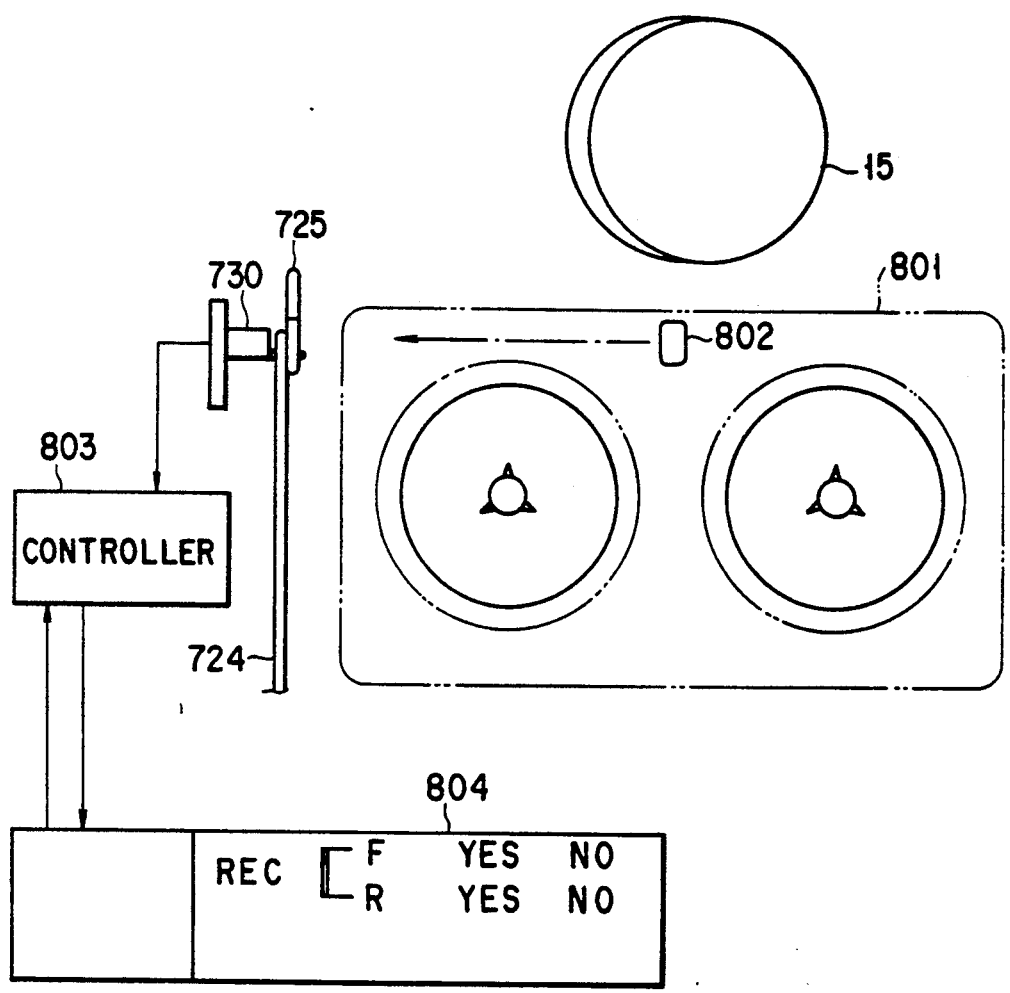
F I G. 14

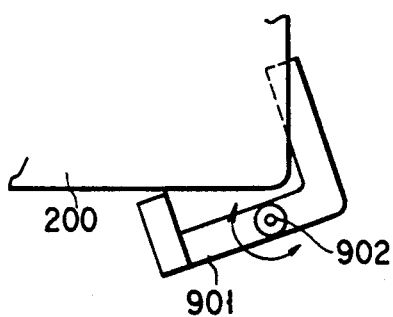 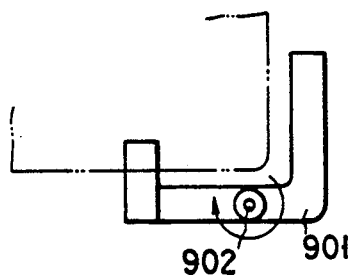
F I G. 16A  F I G. 16B
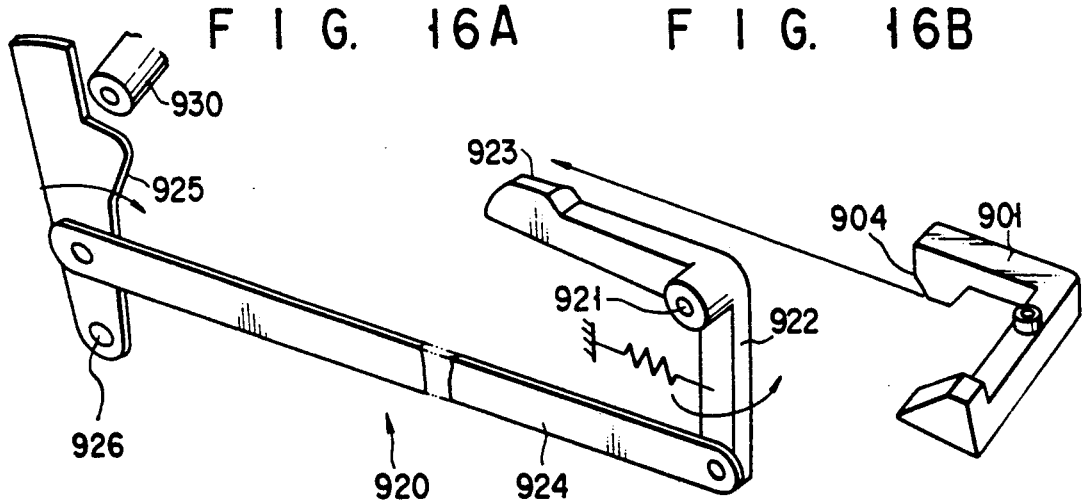
F I G. 16C

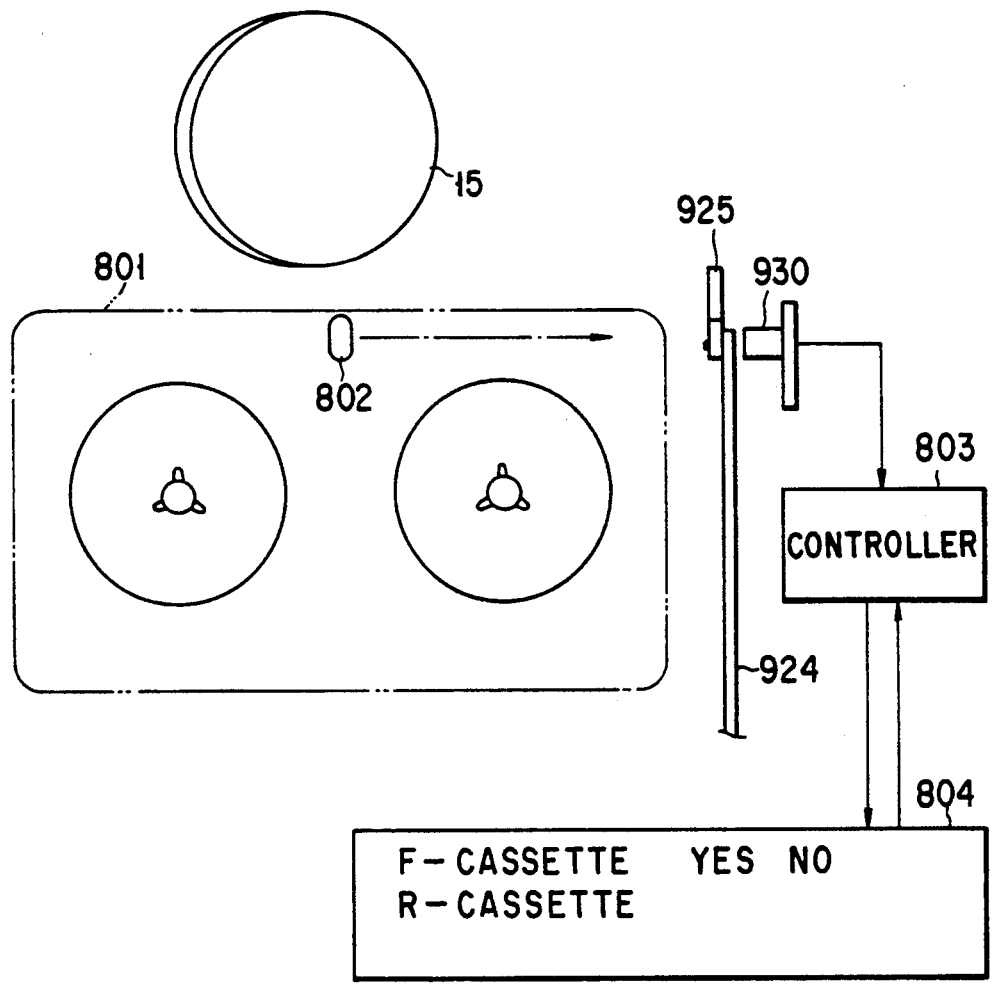
F I G. 17

CASSETTE DATA DETECTING APPARATUS OF SYSTEM FOR MOUNTING A PLURALITY OF CASSETTES

BACKGROUND OF THE INVENTION

1. Field of the Invention

The present invention relates to a cassette data detecting apparatus of a system for loading a plurality of cassettes, which is incorporated in, e.g., a video tape recorder (to be referred to as a VTR hereinafter) or a digital audio tape recorder (to be referred to as a DAT hereinafter) and detects the presence/absence of a cassette or the presence/absence of a safety lug (erroneous erasure preventing lug) of a cassette.

2. Description of the Related Art

Recently, long TV programs have been increased in number, and the number of midnight broadcast TV programs has been increased after the start of satellite broadcasting. Therefore, the recording mode of VTRs is being changed to a mode capable of preforming timer or unattended recording or long-time recording.

Existing VTRs, however, can load only one tape cassette, and this limits a recording capacity in performing long-time recording or unattended recording. In addition, the dimensional standard of cassettes brings about limitations in the formation of large-capacity cassette tapes. In order to solve these problems, a VTR which can load a plurality of cassettes is proposed.

A VTR generally has a safety lug detecting apparatus for detecting the presence/absence of a safety lug. Conventional safety lug detecting apparatuses perform detection by inserting the distal end of a lever into a recess portion formed in the rear end face of a cassette when the cassette is placed in a predetermined loading position close to a rotary head drum. That is, a safety lug is formed in the recess portion, and a user snaps this lug off in order to obtain erasure prevention (recording inhibition). As a result, the distal end of a detecting lever enters the recess portion to activate a recording inhibiting function when the cassette is loaded. However, when the lug is not snapped, the detecting lever does not enter the recess portion. Therefore, since the recording inhibiting function does not operate, recording can be performed.

As described above, conventional safety lug detecting apparatuses detect the presence/absence of a lug after a cassette is placed in a predetermined loading position. Therefore, in the case of a VTR which can load a plurality of cassettes, it is impossible to determine whether recording can be performed before another cassette replaces the cassette loaded in a predetermined loading position. That is, in a system loading a plurality of cassettes, whether each of the cassettes is recordable cannot be determined until the cassette is placed in a predetermined driving position. This makes it meaningless to load a plurality of cassettes in order to perform long-time recording.

In addition, when a carrying unit capable of loading a plurality of cassettes is provided in a VTR, it is necessary to check data indicating whether a cassette is present or absent in each cassette loading position.

SUMMARY OF THE INVENTION

It is, therefore, an object of the present invention to provide a cassette data detecting apparatus of a system for loading a plurality of cassettes, in which a plurality of cassettes can be loaded on a carrying unit, and which can determine shortly after a plurality of cassettes are loaded on the carrying unit whether each of the cassettes is recordable, thereby improving reliability in handling.

In order to achieve the above object, the present invention comprises:

a housing incorporating a tape recording/reproducing function, an opening portion formed in a front wall of the housing, a carrying unit which is arranged to be movable in said housing and in which cassettes can be placed through said opening portion, lug detecting means for detecting the presence/absence of a safety lug of a cassette placed in said carrying unit while said carrying unit moves into said housing, a carrying unit which is arranged to be movable in said housing and in which cassettes can be placed through said opening portion, and detecting means for detecting whether a cassette is placed in said carrying unit while said carrying unit moves into said housing.

The above detecting means can determine whether loaded cassettes are recordable quickly during insertion of the carrying unit or tray unit. Therefore, when a plurality of cassettes are placed on the tray unit, a recording chance cannot be missed as is the case in conventional systems, and this improves the reliability in handing.

It is another object of the present invention to provide a cassette data detecting unit of a system for loading a plurality of cassettes in which a plurality of cassettes can be loaded on a carrying unit, and which can determine quickly whether a cassette is loaded on the carrying unit, thus improving reliability in handling.

In order to achieve the above object, the present invention comprises:

a housing incorporating a tape recording/reproducing function, an opening portion formed in a front wall of the housing, a carrying unit which is arranged to be movable in said housing and in which cassettes can be placed through said opening portion, and detecting means for detecting the presence/absence of a cassette placed in said carrying unit while said carrying unit moves into said housing.

The above detecting means can determine the presence/absence of a cassette quickly during insertion of the carrying unit or tray unit. Therefore, when a plurality of cassettes are placed on the tray unit, a recording chance cannot be missed as is the case in conventional systems, and this improves the reliability in handling.

BRIEF DESCRIPTION OF THE DRAWINGS

FIGS. 6A, 6B, and 6C are views showing the basic arrangement of the VTR according to the present invention, for explaining its first, second, and third operation modes;

FIGS. 7A and 7B are views for explaining the arrangements of a pantograph mechanism and a driving mechanism of the above VTR;

FIGS. 10A and 10B are views for explaining the arrangement and the operation of a pop-out mechanism of the above VTR;

FIGS. 12A and 12B are a perspective view and a rear view showing a safety lug detecting portion of the above VTR;

FIGS. 13A, 13B, and 13C are views for explaining the operation and the basic arrangement of an embodiment of a safety lug detecting apparatus of the above VTR;

FIG. 14 is a view for explaining an example of use of the apparatus shown in FIGS. 13A to 13C;

FIGS. 16A, 16B, and 16C are views for explaining the operation and the basic arrangement of a cassette detecting apparatus in the embodiment of FIGS. 13A to 13C of the present invention;

FIG. 17 is a view for explaining an example of use of the apparatus shown in FIGS. 16A to 16C;

DETAILED DESCRIPTION OF THE PREFERRED EMBODIMENTS

Embodiments of the present invention will be described below with reference to the accompanying drawings.

Figure 1:
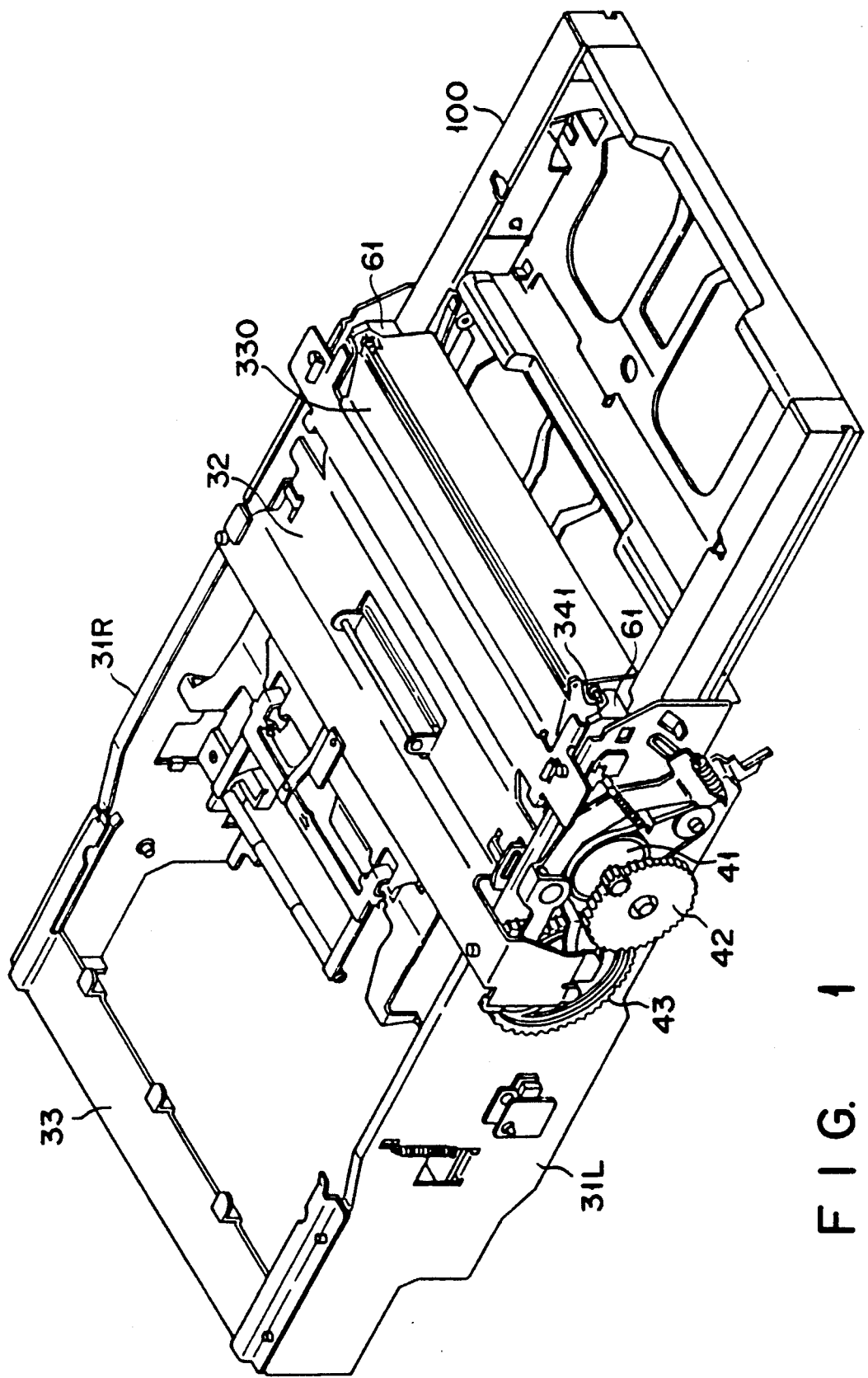
FIG. 1 is a perspective view showing a VTR mechanism according to the present invention viewed from the front on the right side.
Figure 2:
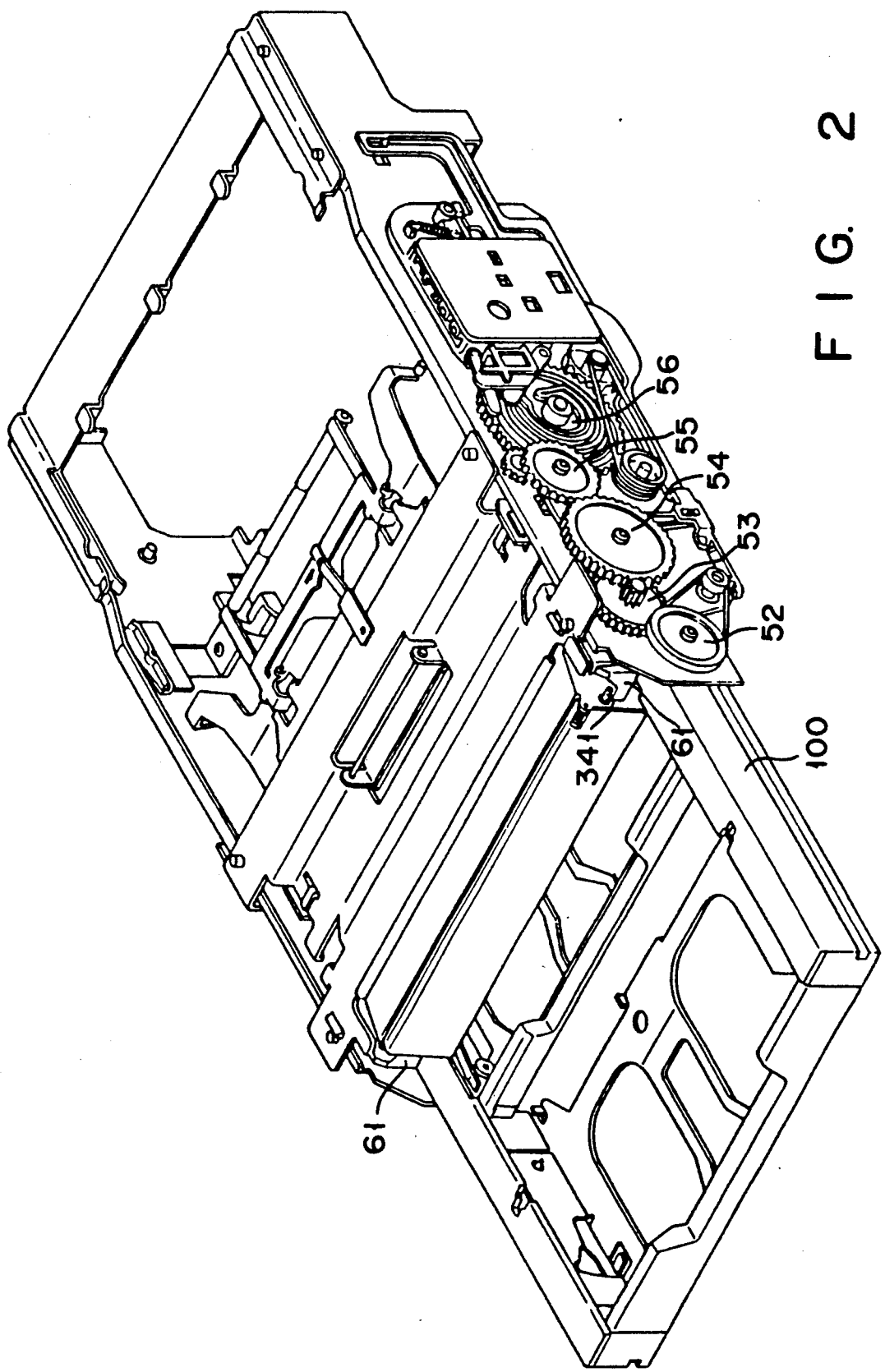
FIG. 2 is a perspective view showing the VTR according to the present invention viewed from the front on the left side.
Figure 3:
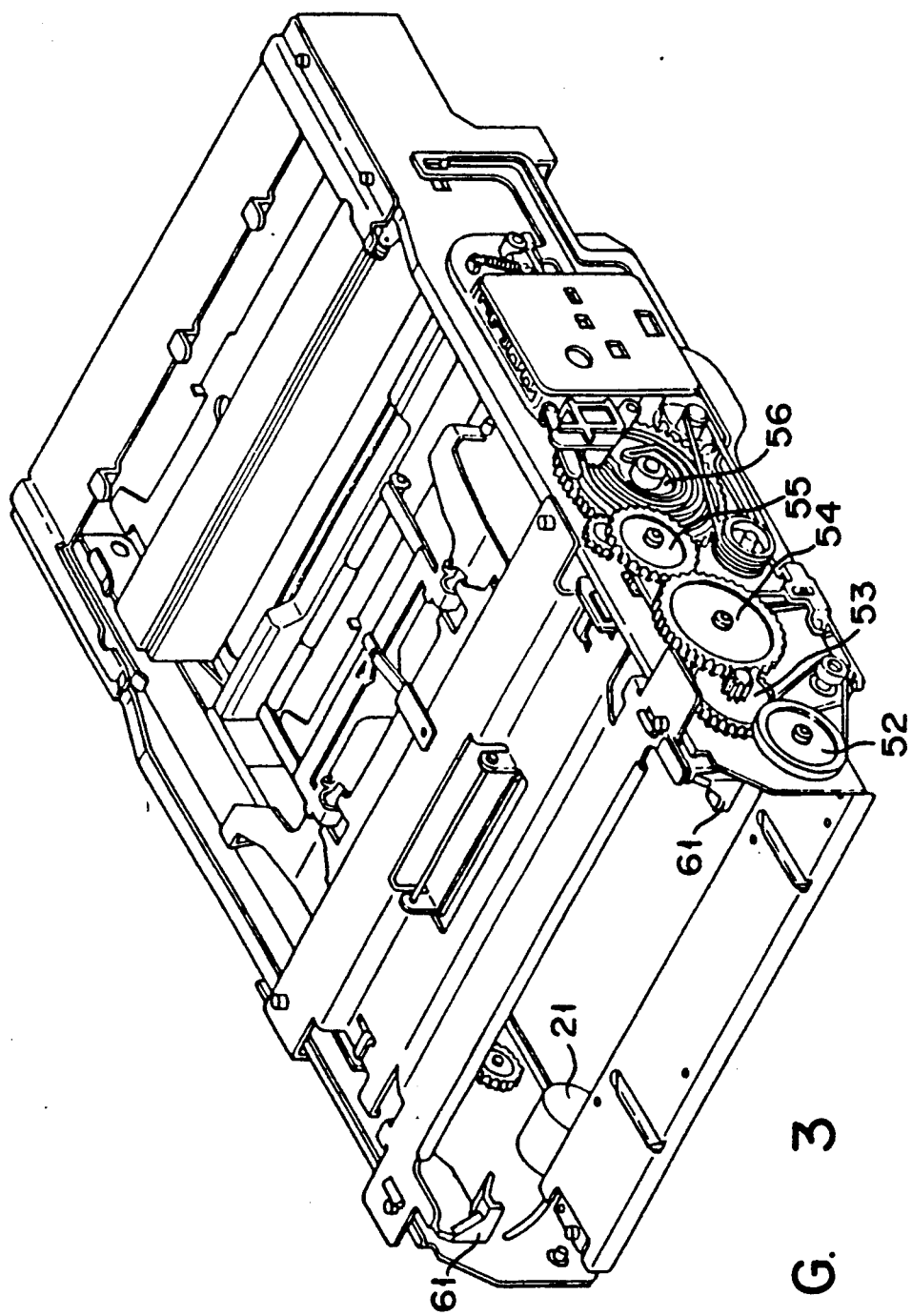
FIG. 3 is a perspective view showing another operation state of the VTR mechanism according to the present invention viewed from the front on the left side.
Figure 4:
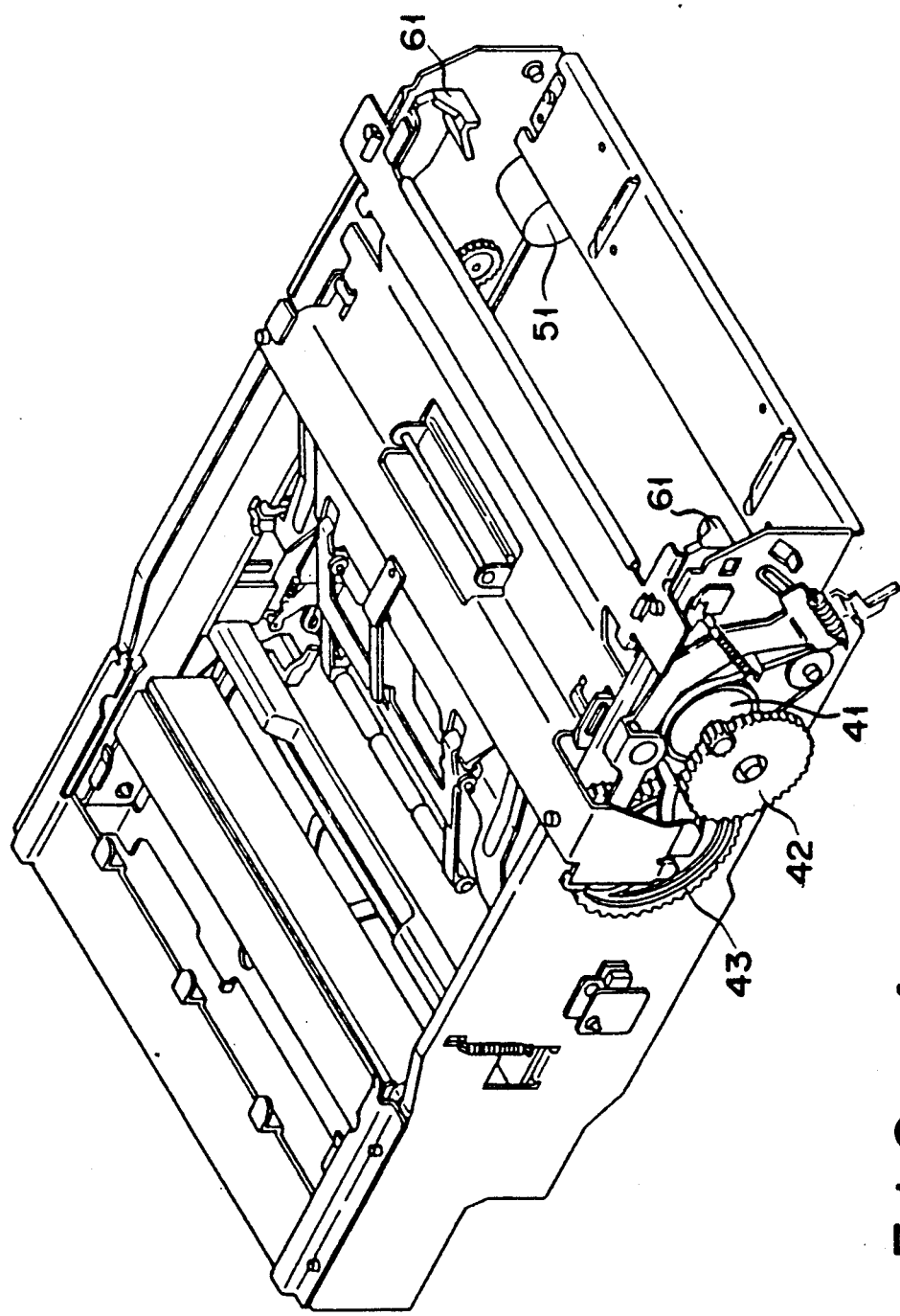
FIG. 4 is a perspective view showing still another operation state of the VTR mechanism according to the present invention viewed from the front on the right side.

FIGS. 1 to 5 show the outer appearance of a VTR mechanism according to the present invention, in which a chassis main body is pulled out from a housing. FIG. 1 is a left-side front view showing a state in which a tray unit 100 is pulled out to its fullest extent from the chassis main body. FIG. 2 is a right-side front view showing the same state (FIG. 1) in which the tray unit 100 is pulled out to its fullest extent from the chassis main body. FIGS. 3 and 4 are right- and left-side front views, respectively, showing a state in which the tray unit 100 is fully retracted within the housing.

The chassis main body is constituted mainly by left and right side plates 31L and 31R, a plate 32 spanning across the upper front portions of the left and right side plates 31L and 31R, and a plate 33 spanning across their upper rear portions. The side plate 31L is equipped with a horizontal driving motor 21 (shown in FIG. 3) for driving the tray unit 100 back and forth, and gears 41 and 42 and a cam 43 (shown in FIGS. 1 and 4) for driving a member interlocked with the back-and-forth movement of the tray unit 100. A vertical driving motor 51 (shown in FIG. 4) for vertically moving a cassette placed on the tray unit 100 is mounted on the side plate 31R. The side plate 31R is also provided with gears 52, 53, 54, and 55 and a cam 56 (shown in FIGS. 2 and 3) for transmitting the rotation of the vertical driving motor 51 to individual components. A detailed horizontal movement of the tray unit 100 and a means for controlling the vertical movements of a cassette placed on the tray unit 100 will be described later.

Figure 5:
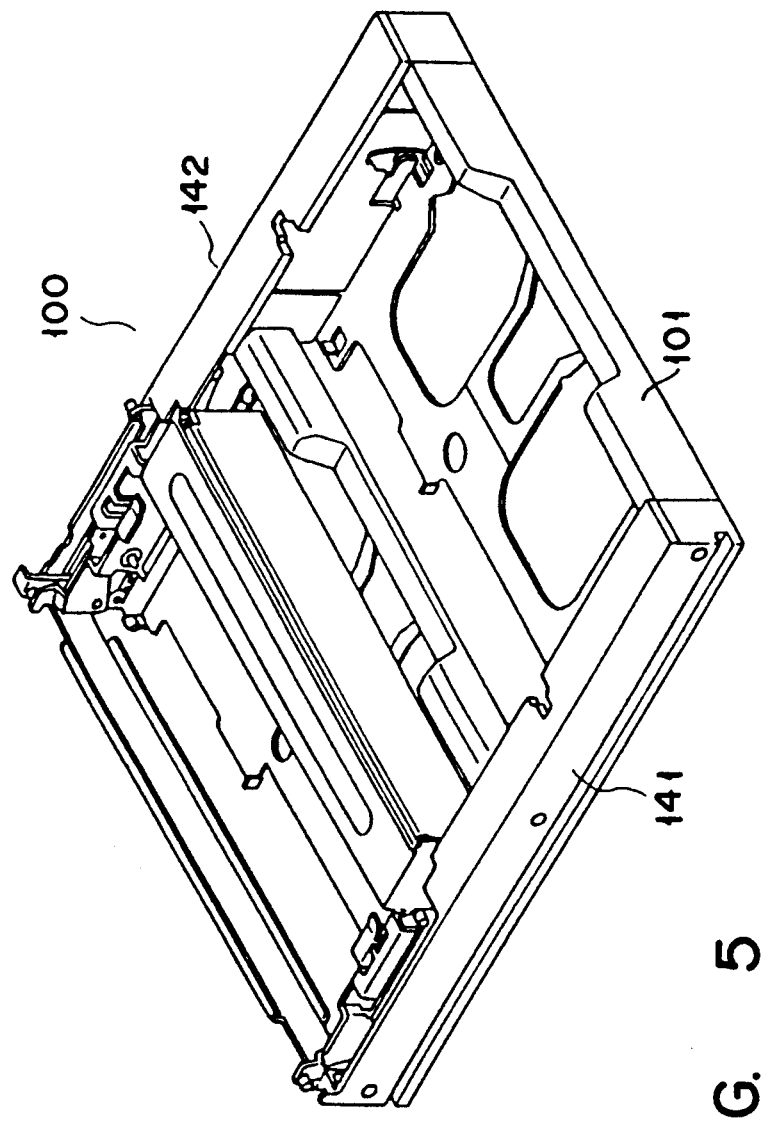
FIG. 5 is a perspective view showing a frame used in the VTR according to the present invention.

FIG. 5 shows the outer appearance of the tray unit 100. The tray unit 100 has a tray frame 101 which looks like a frame when viewed from above. Rails formed outside the side plates of the tray frame are guided by rollers provided inside the side plates of the chassis to move the tray frame horizontally. A portion constituting each of left and right frames 141 and 142 of a frame 101 has an internal cavity which accommodates a link lever of a pantograph mechanism and the like as will be described later.

Figure 6C:
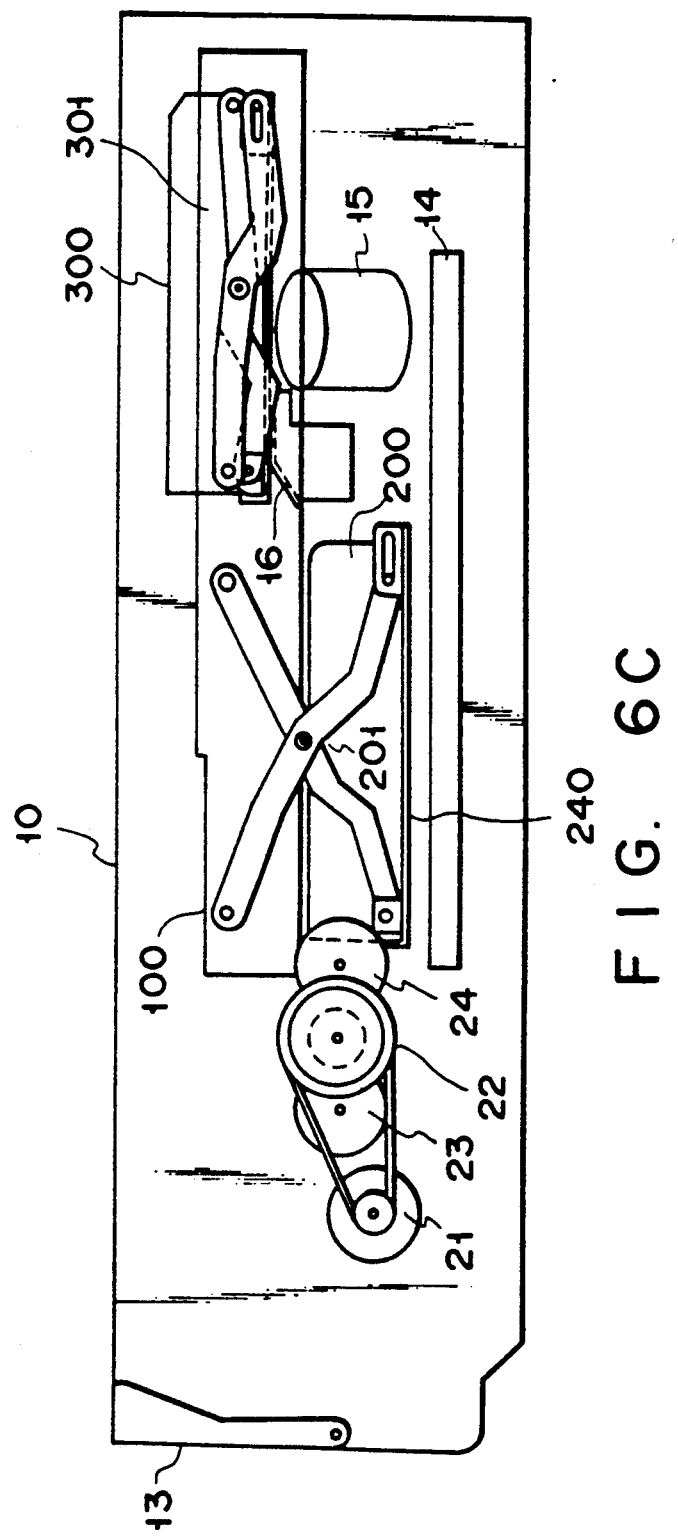

FIGS. 6A, 6B, and 6C are views for explaining the basic arrangement of cassette loading and unloading of the VTR according to the present invention. Reference numeral 10 denotes a VTR housing having an opening 12 formed in its front wall. The tray unit 100 can be inserted horizontally in the housing 1 or exposed from inside the housing 10 in the front-and-back direction through this opening 12. Note that reference numeral 13 denotes a cover provided for the opening 12. The cover 13 is opened when the tray unit 100 is pulled out from the housing 10 and is closed after it is inserted into the housing 10. This opening/closing of the cover 13 is realized by a cover opening/closing mechanism interlocked with the tray unit 100, although not shown.

A motor 21 as a tray driving mechanism is provided at a fixed position in the housing 10 and rotates an intermediate gear 22. The intermediate gear 22 has a rotating shaft perpendicular to the front-and-back moving direction of the tray unit 100. The intermediate gear 22 can rotate driving gears 23 and 24 located rotatably before and behind it. The driving gears 23 and 24 mesh with a rack formed on the lower surface of the side portion of the tray unit 100 and drive the tray unit 100 back and forth. This VTR also incorporates a mechanism for placing a cassette in a predetermined position to execute tape loading. Reference numeral 14 denotes a main chassis including a reel shaft which engages with a reel hub of a cassette and various components (not shown) required for tape loading and driving; and 15, a rotary head drum with which a tape extracted from a cassette placed on the predetermined loading position is brought into contact upon tape loading. FIGS. 6A, 6B, and 6C show a state in which the front driving gear 23 meshes with the rack, a state in which both the front and rear driving gears 23 and 24 mesh with the rack, and a state in which the rear driving gear 24 meshes with the rack, respectively.

The tray unit 100 has a tray frame which looks like a frame when viewed from above. Rails formed outside the side plates of the tray frame are guided by rollers provided inside the housing to move the tray frame horizontally.

In this system, two cassettes 200 and 300 can be arranged in front and back regions on the upper surface of the tray unit 100 (FIG. 6A). Pantograph mechanisms 201 and 301 are mounted on the front and back regions of the tray unit 100. The pantograph mechanisms 201 and 301 have the same structure and each can move a cassette bottom support plate vertically by means of a link mechanism.

FIG. 6A shows a state in which the cassettes 200 and 300 are placed in the front and back regions Each of the cassettes 200 and 300 directs its front end portion toward an obliquely upper position because this front end portion is lifted by a pop-up mechanism provided in the tray unit 100 to facilitate insertion and removal of the cassette. In addition, the rear cassette 300 can be removed without completely pulling out the tray unit 100 from the opening 12 of the housing 10. That is, the front cassette 200 is entirely exposed, whereas only a portion (distal end portion) of the rear cassette 300 is exposed from the opening. With this design, the tray unit 100 need only be pulled by a short distance, and this decreases the surrounding space occupied by the system for handling it.

FIG. 6B shows a state in which the rear pantograph mechanism 301 loads the cassette 300 in a tape loading position below a portion where the tray passes. FIG. 6C shows a state in which the front pantograph mechanism 201 moves the cassette 200 downward to load it in a predetermined tape loading position. To transit from the state shown in FIG. 6A to the state shown in FIG. 6B, the tray driving mechanism operates to horizontally move the tray unit 100 inside the housing 10. Upon arriving at a first detection position (rear cassette driving position), the tray unit 100 is stopped. At this position, a pantograph driving mechanism (to be described later) operates to drive the pantograph mechanism 301, thereby moving the cassette 300 downward. To transit from the state shown in FIG. 6B to the state shown in FIG. 6C, the pantograph driving mechanism drives the pantograph mechanism so as to lift the cassette 300 from the lower position and return it to its original position in the tray unit 100. Subsequently, the tray driving mechanism further moves the tray unit 100 inward and stops the movement of the tray unit 100 when the tray unit 100 reaches a position above a cassette loading position, i.e., a second detection position (front cassette driving position). This time, the pantograph drive mechanism drives the pantograph mechanism 201 to move the cassette 200 down to a predetermined position.

In the state shown in FIG. 6C, the pantograph mechanism 301 which mounts the rear cassette 300 is located immediately above the rotary head drum 15. At this position, the pantograph mechanism 301 is guided in a direction along which it floats a short distance from the tray unit 100, thereby preventing collision of the cassette 300 and the pantograph mechanism 301 against the rotary head drum 15. A member which lifts the pantograph mechanism 301 is a guide member 16 projecting from the inner side surface of the housing 10. That is, when the tray unit 100 further moves inward from the state shown in FIG. 6A with the cassette 300 being lifted, the bottom plate of the pantograph mechanism 301 rides on the inclined surface of the guide member 16. The cassette 300 or the pantograph mechanism is lifted slightly at the standby position of the cassette 300 because if the height of the housing 100 is decreased for a low-profile arrangement, the locus of movement of the tray unit 100 crosses the upper portion of the rotary head drum 15. This arrangement also reduces a temperature rise of the VTR by improving ventilation around the rotary head drum 15 and also improves the safety of a cassette tape.

From the comparison between the states shown in FIGS. 6A and 6C, the following design of this system will be understood. That is, the tray unit 100 is pulled out the farthest in the state of FIG. 6A and is retracted the most in the state of FIG. 6C. A rack provided on the edge of the lower surface of the tray unit 100 meshes with the gears 23 and 24 to move the tray unit 100 back and forth. In this case, the two gears 23 and 24 are aligned along the moving direction of the tray and interlocked through the intermediate gear 22 such that only the gear 23 meshes with the rack in the state shown in FIG. 6A, whereas only the gear 24 meshes with it in the state shown in FIG. 6C. With this arrangement of the gears 23 and 24, it is possible to decrease the total length of the tray unit 100 in the front-and-back direction. If one attempts to realize the driving gear mechanism of the tray unit 100 with only a single gear, the total length of the tray unit 100 becomes inevitably larger than that of this embodiment since the single gear must mesh with the rack in both the states of FIGS. 6A and 6C.

This miniaturization of the tray unit 100 in its total length reduces the load on the driving unit by decreasing the weight of the tray unit. This small total length can also narrow the space into which the tray unit 100 projects upon cassette loading and in this way can decrease the surrounding space occupied by the system. In other words, the stroke of movement of the tray unit 100 can be increased even with the small total length of the tray unit.

FIGS. 7A and 7B show the pantograph mechanism 301 together with its pantograph driving mechanism. Although various modifications of the pantograph mechanism 301 are possible, the pantograph mechanism 301 of this system has a basic arrangement in which first and second link levers 311 and 312 are arranged to cross each other like an x mark when viewed from the side surface. The crossing portions of the link levers 311 and 312 are coupled by a shaft 313. This enables the link levers 311 and 312 to move their respective two end portions apart from (rise) or close to (fall) each other as shown in FIGS. 7A and 7B, respectively. The front end portions of the link levers 312 and 311 are pivotally mounted on a frame 101 of the tray unit 100 and on a mounting portion 402 of a cassette bottom support plate 401 through shafts 102 and 403, respectively. The rear end portion of the link lever 311 is engaged with an elongated hole 103 formed in the frame 101 through a pin 104. The rear end portion of the link lever 312 is engaged with an elongated hole 405 formed in a mounting portion 404 of the cassette bottom support plate 401 through a pin 406. With this arrangement, the link mechanism can move the cassette bottom support plate 401 to the upper or lower position.

The pantograph driving mechanism for driving the pantograph mechanism 301 will be described below.

The pantograph driving mechanism has a pivotal member 501 for pushing down or pulling up an intermediate cam 320 which is pivotally provided on the link lever 312. The intermediate cam 320 is pivotally mounted in the middle of the link lever 312 by a shaft 321 and moves vertically in accordance with the movement of the link lever 312. In this case, an engagement pin 322 is provided in the intermediate cam 320. This engagement pin 322 engages with a hole 121 of a guide plate 120 attached to the frame 101 at a predetermined interval therebetween. This hole 121 is like a groove and has a locking function of locking the rise position of the pantograph mechanism and a regulating function of regulating the locus of vertical movements of the pantograph mechanism and the lower position of the mechanism. That is, since the engagement pin 322 of the intermediate cam 320 moves along the hole 121, the locus upon vertical movements is regulated, and the lower position is determined by the lower end portion of the hole 121. Upon rising, the engagement pin 322 engages with a locking portion 121A formed as a stepwise recess in the hole 121 to prevent an unexpected downward movement of the pantograph mechanism.

A guide groove 122 is further formed in the guide plate 120 in parallel with the hole 121. This guide groove 122 is so formed as to notch the guide plate 120 at its upper and lower end portions. The pivoting distal end of the intermediate cam 320 is located to overlap and cross the guide groove 122. Since the guide groove 122 is cut away in the vertical direction, a roller 502 provided at the distal end of the pivotal member 501 can pass through this groove. The roller 502 faces guide groove 122 from the above on the drawing surface.

The pivotal member 501 is pivotally mounted by a shaft 503 at a fixed position (above the path through which the tray unit 100 passes) inside the housing, and its pivoting distal end can move vertically along the guide groove 122. FIG. 7B shows a state before the pantograph driving mechanism operates, in which the roller 502 is located in an upper portion of the entrance of the guide groove 122. When a position detecting means of the tray unit 100 outputs position detection data, the pivotal member 501 is driven to pivot about the shaft 503 by a driving means (not shown). In this state, the roller 502 enters the guide groove 122. When the roller 502 abuts against the pivoting end portion of the intermediate cam 320, the intermediate cam 320 slightly pivots clockwise. For this reason, the engagement pin 322 of the intermediate cam 320 can move away from the locking portion 121A and downward along the hole 121. Therefore, the pivotal member 501 continuously pivots to the state shown in FIG. 2A. With this pivotal motion, the cassette bottom support plate 401 supported by the pantograph mechanism moves downward to load a cassette in a predetermined loading position. At this time, the position of the engagement pin 322 of the intermediate cam 320 is regulated by the hole 121, and this consequently determines the position the cassette. At the same time, the roller 502 of the pivotal part 501 engages with U-shaped groove of the intermediate cam 320. Therefore, the pantograph mechanism is locked at that position. In addition, an elastic holding member which rotates with the shaft 503 of the pivotal member 501 holds the right and left central portions of the cassette from the above.

FIG. 7A shows a state in which the cassette bottom support plate 401 is at its lower position. In order to transit from this lower position to an upper position, the pivotal member 501 is pivoted counterclockwise by a driving means (not shown). Since the roller 502 engages with the U-shaped recess of the intermediate cam 320, it pulls up the intermediate cam 320. With this movement, the link mechanism operates to raise the cassette bottom support plate 401. Immediately before the intermediate cam 320 is set in the state shown in FIG. 7B, the roller 502 pushes the intermediate cam 320 counterclockwise. As a result, the engagement pin 322 of the intermediate cam 320 moves to the locking portion 121A. Therefore, when the cassette bottom support plate 401 rises to the same level as the tray unit 100, the link mechanism does not unexpectedly move down.

FIGS. 7A and 7B illustrate the pantograph mechanism and its driving mechanism on the left side of the opening. However, the similar mechanisms are also provided on the right side, and these left and right mechanisms operate in synchronism with each other.

The pantograph driving mechanism will be described in more detail below.

Figure 8:
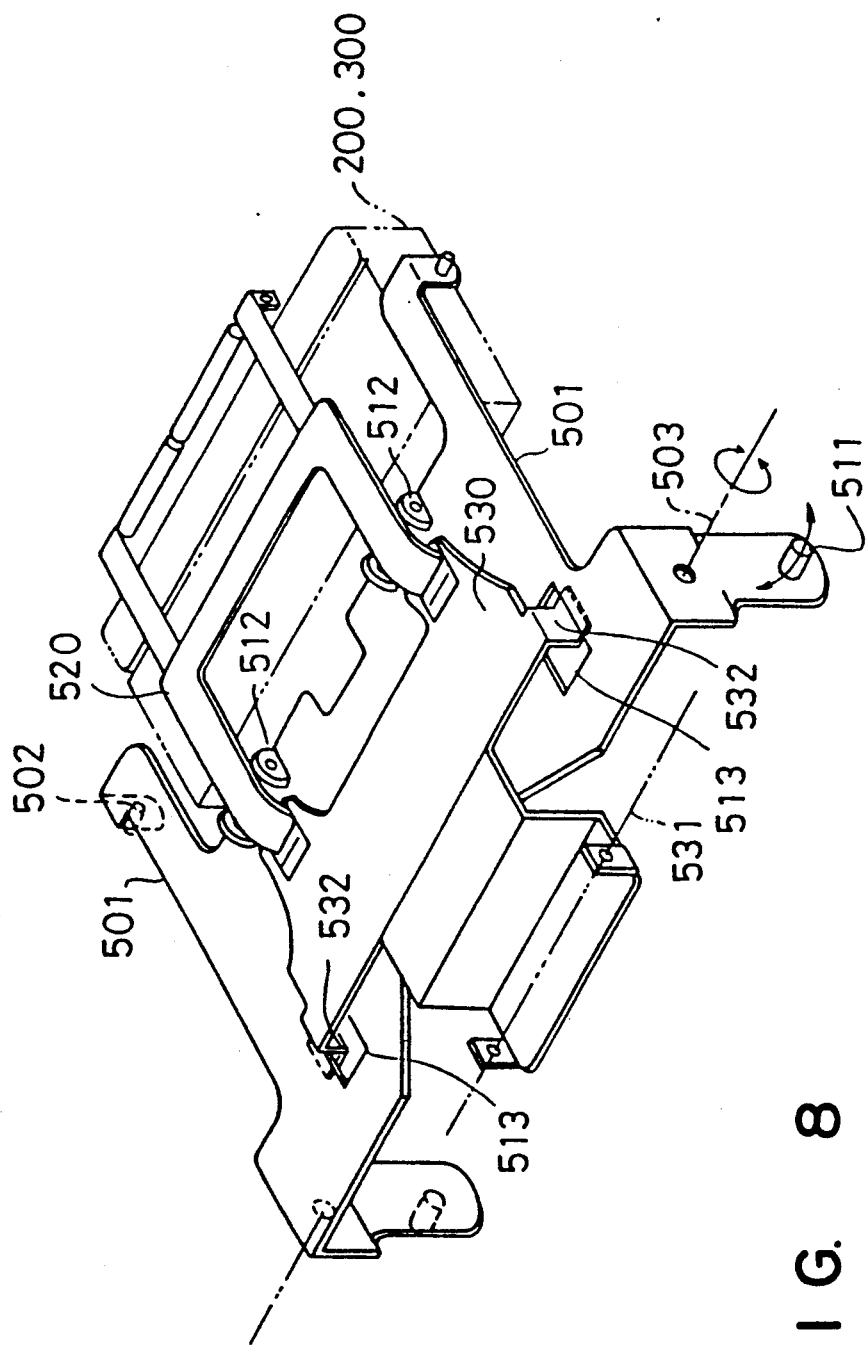
FIG. 8 is a view for explaining the arrangements of a pantograph driving mechanism and a cassette holding mechanism of the above VTR.

FIG. 8 shows the relationship between the pantograph driving mechanism and a cassette holding mechanism. As described above, the pivotal member 501 pivots about the shaft 503. The power for pivoting this component is transmitted when a vertical control cam (not shown) drives a pin 511. This vertical control cam is mounted on the side portion of the chassis inside the housing and is driven by a vertical motor (not shown).

A cassette holding member 520 is mounted on the upper surface of the pivotal member 501 so as to pivot about shaft 512. The pivoting distal end of the cassette holding member 520 extends longer than the distal end of the pivotal member 501 in the same direction. The proximal end portion of the cassette holding member 520 engages with the pivoting distal end of a control plate 530. The proximal end portion of the control plate 530 is supported pivotally by a shaft 531 which is attached to a fixed position of the chassis inside the housing. The pivoting distal end portion of the control plate 530 is arranged on the upper surface side of the pivotal member 501, and locking pieces 532 are formed in this portion. These locking pieces 532 engage with holes 513 formed in the pivotal member 501.

As the pivotal member 501 drives the pantograph mechanism, the cassette holding member 520 pivots about the shafts 512 to hold the cassette 200 or 300.

Figure 9A:
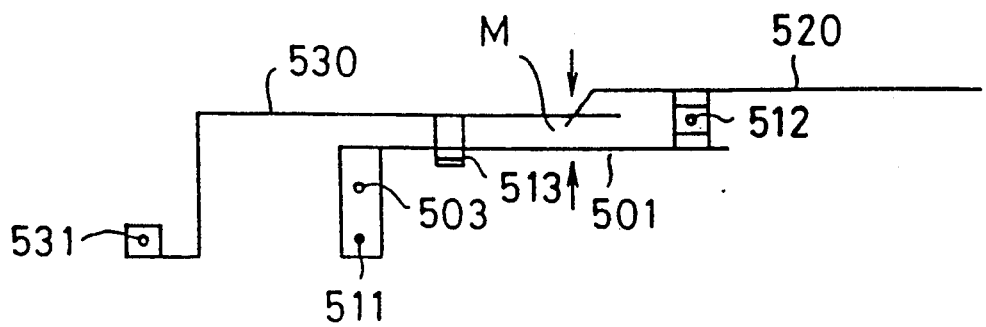
FIGS. 9A to 9C are views for explaining the operation of the cassette holding mechanism.
Figure 9B:
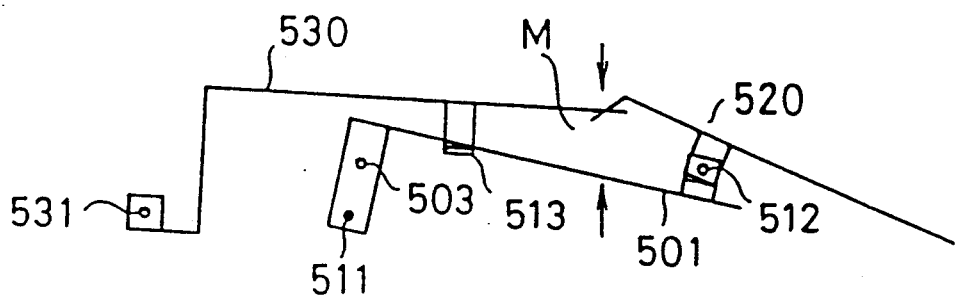
Figure 9C:
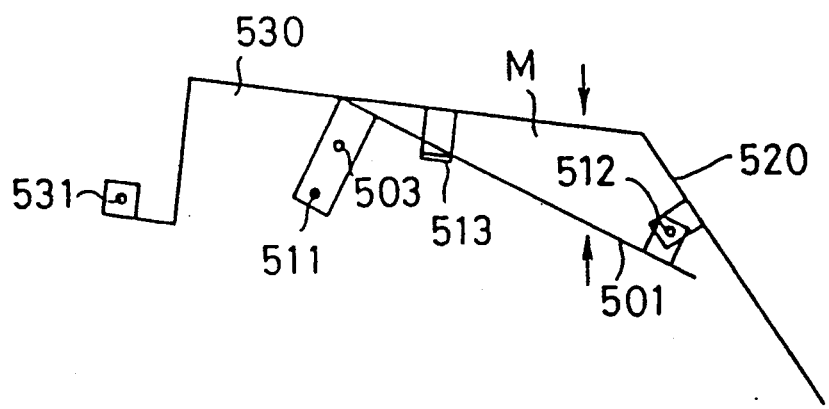

FIGS. 9A to 9C are views for explaining the operation of the above mechanism. FIGS. 9A, 9B, and 9C illustrate a state obtained before a cassette is held, a state obtained while the cassette is held, and a state obtained after the cassette is completely held in the cassette driving position, respectively. As shown in FIGS. 9A to 9C, since the pivot center of the pivotal member 501 is different from that of the control plate 530, an interval M between the pivoting distal ends of the two components is enlarged as the pivotal member 501 pivots. This causes the distal end of the control plate 530 to relatively pivot the proximal end portion of the cassette holding member 520 clockwise about the shafts 512. As a result, the pivotal speed of the pivoting distal end of the cassette holding member 520 becomes higher than that of the pivoting distal end of the pivotal member 501 to make it possible to hold a cassette more strongly. The distal end portion of the cassette holding member 520 is constituted by elastic leaf springs with rollers for holding a cassette at their distal ends.

FIGS. 10A and 10B show the pop up mechanism for facilitating handling of the cassette 200 or 300 from outside when the tray unit 100 is pulled out from the housing 10. When the tray unit 100 is pulled out from the housing 10, the front and rear cassettes 200 and 300 are set parallel with each other by the pop-up mechanism with their front ends being inclined upward. The arrangement is designed such that the rear cassette 300 is inserted in a pop-up member 330 in the back region with its bottom surface sliding on the top surface of the front cassette 200.

FIG. 10A shows a state in which a pop-up member 230 in the front region and the rear pop-up member 330 lift the respective cassettes 200 and 300.

The front pop-up mechanism will be described below.

The pop-up member 230 has a shaft 231 about which the front-side pivoting end freely pivots in the vertical direction. A support portion 232 is formed at the front-side pivoting end. This support portion 232 can lift the bottom portion of the cassette 200. Although not shown, the shaft 231 is mounted on the left side plate of the left and right side plates of the cassette bottom support plate. Therefore, when the cassette bottom support plate 240 is moved down by the pantograph mechanism 201 as described above, the shaft 231 can move down together with the plate 240.

A slider 260 is arranged on the inner wall of the frame 101. The slider 260 can move with respect to the frame 101 in the same direction as the moving direction of the frame 101. Elongated holes 261 and 262 of the slider 260 engage with pins 111 and 112 projecting from the inner wall of the frame 101. The slider 260 also has a notched portion 264 at a position corresponding to the pop-up member 230. This notched portion 264 communicates with the elongated hole 261 and has an inclined portion. It is possible through this notched portion 264 to insert a pin 233 mounted on the pop-up member 230 into the elongated hole 261. This is required to move the pop-up member 230 downward and return it to its original position together with the cassette bottom support plate 240 when the plate 240 is moved down by the pantograph mechanism.

When the tray unit 100 is inserted into the housing 10, the state is changed from FIGS. 10A to 10B, and the front cassette 200 is set parallel to the tray unit 100 by the pivotal motion of the pop-up member 230. That is, when the tray unit 100 further moves inward from the state shown in FIG. 10B, the pins 111 and 112 and the pop-up member 230 together move backward (relatively, the slider 260 moves forward). Therefore, the pin 233 abuts against the corner of the notched portion 264, i.e., there is no portion for supporting the pin 233 from the below. In this state, the slider 260 and the frame 101 move together backward. Since the pop-up member 230 has the notched portion 264 (which is connected to the end portion of the elongated hole 261 and has an L shape to open downward), its pivoting distal end pivots downward to place the cassette 200 on the cassette bottom support plate 240.

Conversely, when the tray unit 100 is pulled out from the inside, the frame 101, the slider 260, and the pop-up member 230 move together forward. During this movement, however, the slider 260 is stopped by a stopper 18 provided at a fixed position inside the housing and therefore no longer moves forward. When the frame 101 further moves forward from this state, the slider 260 relatively moves backward, and the pin 233 of the pop-up member 230 is guided by the inclined portion of the notched portion 264 to enter the elongated hole 261. This operation directs the pivoting distal end of the pop-up member 230 upward, and the result is the state shown in FIGS. 10A and 10B.

The pop-up mechanism for driving the rear pop-up member 330 and the operation of the mechanism will be described below.

The pop-up member 330 has an opening through which the cassette 300 can be inserted from the front. The back portion of the pop-up member 330 is pivotally supported by a shaft 331 so that the front portion of the member can pivot vertically. Although not shown, the shaft 331 is mounted on the left side plate of left and right side plates of the cassette bottom support plate. Therefore, when the cassette bottom support plate 401 is moved down by the pantograph mechanism, the pop-up member 330 can move down or up together with the plate 401. The pivoting distal end of the pop-up member 330 faces upward in FIG. 10A and is parallel to the cassette bottom support plate in FIG. 10B. This is so because a distal end portion 333 of a lever 332 formed at the rear end portion of the pop-up member 330 is pivoted by a projecting portion 19 provided at a fixed position. That is, when the tray unit 100 is completely extended, the pop-up member 330 is pivoted clockwise about the shaft 331 by the projecting member 19. When the tray unit 100 moves backward, the distal end portion 333 of the lever 332 is separated from the projecting portion 19. Therefore, the pop-up member 330 is pivoted counterclockwise to be parallel to the cassette bottom support plate by its own weight or a weak spring.

The operation timings of the front pop up mechanism constituted by the pop-up member 230 and the like and the rear pop-up mechanism constituted by the pop-up member 330 are set as follows.

The front pop-up mechanism raises the front end of the cassette 200 at the position shown in FIG. 10B. When the tray unit 100 is further pulled out from the position shown in FIG. 10B to the position shown in FIG. 10A, the rear pop-up mechanism raises the rear pop-up member 330. As described above, the operation of the pop-up mechanism is obtained by the guidance or collision of the respective components upon movement of the tray unit 100. It is understood from this fact that the force to raise the cassette is obtained by the power of the motor 21 for driving the tray unit 100. Therefore, if both the front and rear pop-up mechanisms are simultaneously operated, a large load is applied to the motor 21. For this reason, a time difference is given between the operations of the front and rear pop-up mechanisms in this system (i.e., after the front pop-up mechanism raises the cassette, the rear pop-up mechanism raises the cassette). Consequently, the load on the motor 21 is reduced, and this enables driving by a low-power motor.

An auxiliary mechanism associated with the pop-up member 330 will be described.

Left and right pins 341 (shown in FIGS. 1 and 2) extend from the two side plates of the pop-up member 330. These pins 341 move in a direction along which the tray unit 100 is pulled. When the pop-up mechanism 330 moves to a predetermined position with its pivoting distal end facing up, the pins 341 ride on rest shelf portions 61 (shown in FIGS. 1 and 2) formed at fixed positions inside the housing. As a result, the lifted state of the pop-up member 330 can be maintained stably to prevent troubles between the projecting portion 19 and the distal end portion 333 of the lever 332. That is, as described above, the pop-up member 330 pivots about the shaft 331, and the projecting portion 19 holds the distal end portion 333 of the lever 332 when the open side of the pop-up member 330 is raised. In this state, however, an excessive force may be applied on the cassette-receiving side of the pop-up member 330 for receiving the cassette 300 upon insertion or removal of the cassette. Therefore, it is sometimes difficult to maintain the raised state of the pop-up member 330 by the engagement between the lever 332 and the projecting portion 19. For this reason, the pins 341 ride on the inclined rest shelf portions 61 to stably maintain the lifted state of the pop-up member 330.

Figure 11:
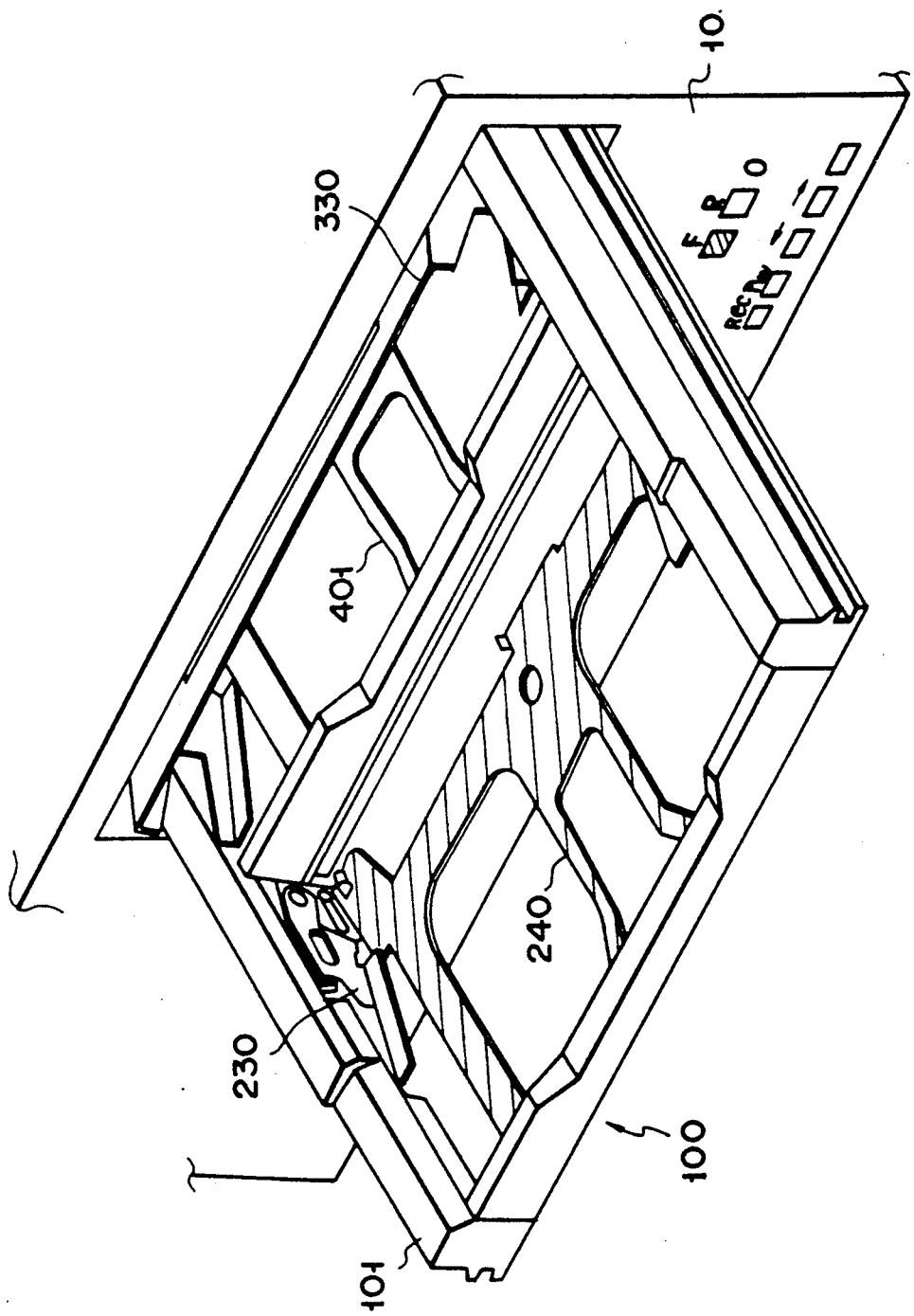
FIG. 11 is a perspective view showing the operation of a tray unit of the above VTR.

FIG. 11 is a perspective view schematically showing a state in which the tray unit 100 is pulled out to its fullest extent from the housing 10. As is apparent from FIG. 11, the pop-up members 230 and 330 are set such that their front pivoting ends face up with respect to the horizontal cassette bottom support plates 240 and 401.

Although two cassette tapes can be loaded in this system as described above, some users selectively use a mode in which only the front region is used and a mode in which only the back region is used. For example, the front cassette is used for both recording and reproduction, whereas the rear cassette is used for reproduction only. In this case, it is necessary to load a cassette for the purpose of reproduction only in the back region and a cassette which can be used in both recording and reproduction in the front region. Possible loading errors in this case can be prevented by, for example, discriminating the cassette bottom support plate 240 in the front region from the cassette bottom support plate 401 in the back region by colors, e.g., blue and red. For example, a user himself or herself can make the discrimination that a cassette usable in recording is to be loaded in the blue loading region and a cassette for the purpose of reproduction only, which is not to be used in recording, is to be loaded in the red loading region. Referring to FIG. 11, this discrimination is made by colors of the front and rear cassette bottom support plates. However, this discrimination by color may be made on the frame or may be made only partially. Alternatively, seals having marks on them may be adhered to the VTR. The operation panel of the VTR main body has operation buttons such as recording (REC), playback (PLAY), rewind, fast-forward, and stop buttons, and is also equipped with buttons constituting a tray mode designation section M, for designating front cassette loading F and rear cassette loading R.

As an example, if the front cassette loading F is selected, the tray unit is moved to the second detection position in the housing 10, and a cassette is transported to the tape driving section by the pantograph mechanism 201, as shown in FIG. 6C. When the rear cassette loading R is chosen, the tray unit is moved to the first detection position in the housing 10, and a cassette is transported to the tape driving section by the pantograph mechanism 301, as shown in FIG. 6B.

This system includes a safety lug detecting apparatus for detecting whether the safety lug of a cassette placed on the tray unit 100 is snapped.

FIGS. 12A and 12B illustrate the left-side rear corner of the frame 101 in detail. FIGS. 12A is a perspective view of the corner, and FIG. 12B is its rear view. An L-shaped notched portion 130 is formed in the lower portion of the corner of the frame 101. An L-shaped lug detecting lever 701 is arranged along this notched portion 130. The middle portion of the lug detecting lever 701 is fixed to the frame via a shaft 702 so that the lever 701 can pivot about the shaft 702. The lug detecting lever 701 is normally biased by a spring (not shown) such that a projection 703 on its one end portion projects inside the frame. A projection 704 projecting downward is formed on the other end portion of the lug detecting lever 701. A groove 131 is formed in the outer side surface of the frame 101, and rollers fixed inside the housing enter this groove. The frame is guided and moved back and forth by these rollers.

FIGS. 13A and 13B show a state in which cassettes 200A and 200B are loaded on the tray unit 100. The safety lug of the cassette 200A is snapped while that of the cassette 200B remains. As is apparent from comparison between FIGS. 13A and 13B, the pivotal angle of the lug detecting lever 701 changes in accordance with the presence/absence of the lug. On the other hand, when the tray unit 100 is inserted into the housing, the lug detecting lever 701 moves together with the frame 101. A shutter mechanism 720 is located below the locus of movement of the lug detecting lever 701 (FIG. 13C). The arrangement of this shutter mechanism 720 is that a pivotal driving lever 722 is mounted on a shaft 721 at a fixed position, and a projection 723 is formed on one end of this driving lever 722. This projection 723 can be brought into contact (or no contact) with the projection 704 of the lug detecting lever 701. This contact (or no contact) can be made only when the lug detecting lever 701 is in the state (in which the safety lug is present) shown in FIG. 13B. In the state (in which no safety lug is present) shown in FIG. 13A, the two projections are brought into no contact (or contact) with each other. When the projection 704 approaches and contacts the projection 723, the driving lever 722 pivots about the shaft 721 in a direction indicated by an arrow. When the projection 704 passes and moves away from the projection 723, the driving lever 722 returns to its original position. During this action, the driving lever 722 drives a shutter plate 725 via an intermediate lever 724 to temporarily interrupt light incident on a tape end detecting element 730. The shutter plate 725 is pivotally supported by a shaft 726 at a fixed position, and its pivoting end portion is coupled to the intermediate lever 724.

According to this safety lug detecting apparatus as described above, when a cassette is loaded in the tray unit and inserted into the housing, the presence/absence of the lug of the cassette can be determined in accordance with the presence/absence of the output from the tape end detecting element 730. Although the tape end detecting element 730 is used in tape end detection, multiple functions can be obtained by this device.

FIG. 14 shows the position of the tape end detecting device, a circuit block for processing detection signals, and an example of a display unit. Reference numeral 801 denotes a predetermined loading position close to the rotary head drum 15. This position is a position in which a cassette is loaded by the pantograph mechanism. When a cassette is set in this loading position, tape driving can be performed. Upon loading a cassette, a light source 802 constituting the tape detecting device enters left and right central holes formed in the bottom surface of the cassette. Although light from this light source 802 is radiated horizontally in both the left and right directions, only an optical path to the left is illustrated in FIG. 14. The tape end photodetecting element 730 using a light-receiving element is provided on the left side of the optical path. The shutter plate 725 is arranged before the element 730.

During insertion of the tray unit 100 into the housing performed after a cassette is loaded on the tray, a safety lug detection mode is set. This mode can be switched as long as a control signal for rotating forward the motor 21 for driving the tray unit 100 is obtained in a system controller 803. If the shutter plate 725 is driven to output a detection signal, the controller 803 determines that the corresponding cassette is recordable, and turns on a display "F (front cassette), YES", for example, on the display unit 804. If no detection signal is obtained, a display "NO" is turned on.

Note that the state in which the lug detecting lever 701 is located in the front region of the frame 101 has been described with reference to FIGS. 12A to 13C. However, a similar lug detecting lever is also provided in the back region of the frame to make it possible to detect the presence/absence of the safety lug of a cassette loaded on that region. Note, however, that the system is designed such that the front and rear lug detecting levers pass the position where the driving lever 722 is arranged, the function of the tape end detecting device is shared by the two levers. Therefore, if both cassettes are recordable, two detection signals are obtained. Note that in the embodiment shown in FIGS. 12A to 14, the data indicating the presence/absence of a lug of a cassette is finally converted into an electrical signal by the tape end detecting element 730 and supplied to the controller 803. However, an electric switching element may be arranged, in place of the shutter mechanism 720, below the locus of movement of the lug detecting lever 701. In this arrangement, the switch is turned on/off in accordance with the position of the projection 704 of the lug detecting lever 701, and an output from the switch is supplied to the controller 803. As a result, the presence/absence of a lug of a cassette can be detected with a simple structure. Alternatively, instead of the lug detecting lever 701, an electric switching element may be provided directly to the tray frame 101. In this case, the switching element is located at the position of the projection 703 and turned on/off in accordance with the presence/absence of a lug of the cassette 200. Further, this system can be similarly applied to a VTR for handling only one cassette.

According to the present invention as described above, it is possible to determine early whether cassettes are recordable after the cassettes are loaded. Consequently, the reliability in handling can be improved.

The above embodiment has been described as an apparatus for detecting a safety lug quickly. The present invention, however, can also be realized as an apparatus for detecting the presence/absence of a cassette quickly.

Figure 15A:
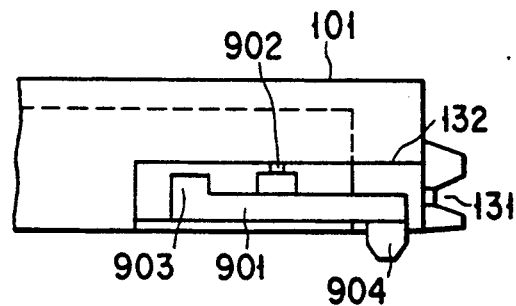
FIGS. 15A and 15B are a perspective view and a rear view, respectively, showing a cassette detecting portion in one embodiment of FIGS. 13A to 13C of the present invention.
Figure 15B:
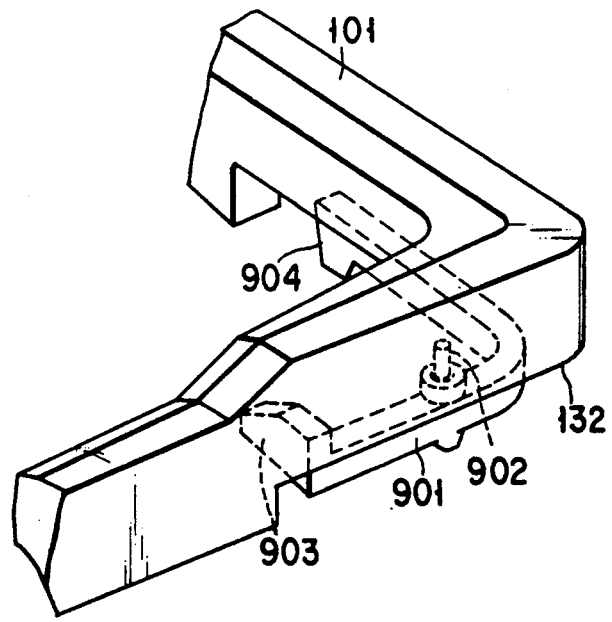

FIGS. 15A and 15B show the right-side rear corner of the frame 101 in detail. FIGS. 15A is a rear view of the corner, and FIG. 15B is its perspective view. An L-shaped notched portion 132 is formed in the lower portion of the corner of the frame 101. An L-shaped lug detecting lever 901 is arranged along this notched portion 132. The middle portion of the cassette detecting lever 901 is fixed to the frame via a shaft 902 so that the lever 901 can pivot about the shaft 902. The cassette detecting lever 901 is normally biased by a spring (not shown) such that a projection 903 on its one end portion projects inside the frame. A projection 904 projecting downward is formed on the other end portion of the cassette detecting lever 901. A groove 131 is formed in the outer side surface of the frame 101, and rollers fixed inside the housing enter this groove. The frame is guided and moved back and forth by these rollers.

FIGS. 16A and 16B show states in which a cassette 200 is present and absent, respectively. As is apparent from comparison between FIGS. 16A and 16B, the pivotal angle of the cassette detecting lever 901 changes in accordance with the presence/absence of the cassette. On the other hand, when the tray unit 100 is inserted into the housing, the cassette detecting lever 903 moves together with the frame 101. A shutter mechanism 920 is located below the locus of movement of the cassette detecting lever 903 (FIG. 16C). The arrangement of this shutter mechanism 920 is that a pivotal driving lever 922 is mounted on a shaft 921 at a fixed position, and a projection 923 is formed on one end of this driving lever 922. This projection 923 can be brought into contact (or no contact) with the projection 904 of the cassette detecting lever 903. This is so because this contact (or no contact) can be made only when the cassette detecting lever 903 is in the state (in which a cassette is present) shown in FIG. 16A. In the state (in which no cassette is present) shown in FIG. 16B, the two projections 904 and 923 are not brought into contact with each other. When the projection 904 approaches and contacts the projection 923, the driving lever 922 pivots about the shaft 921 in a direction indicated by an arrow. When the projection 904 passes and moves away from the projection 923, the driving lever 922 returns to its original position. During this action, the driving lever 922 drives a shutter plate 925 via an intermediate lever 924 to temporarily interrupt light incident on a tape end detecting element 930. The shutter plate 925 is pivotally supported by a shaft 926 at a fixed position, and its pivoting end portion is coupled to the intermediate lever 924.

According to this cassette detecting apparatus as described above, when a cassette is loaded in the tray unit and inserted into the housing, the presence/absence of the cassette can be determined in accordance with the presence/absence of the output from the tape end detecting element 930. Although the tape end detecting element 930 is used in tape end detection, multiple functions can be obtained by this device.

FIG. 17 shows the position of the tape end detecting device, a circuit block for processing detection signals, and an example of a display unit. Reference numeral 801 denotes a predetermined loading position close to the rotary head drum 15. This position is a position in which a cassette is loaded by the pantograph mechanism. When a cassette is set in this loading position, tape driving can be performed. Upon loading a cassette, a light source 802 constituting the tape detecting device enters left and right central holes formed in the bottom surface of the cassette. Although light from this light source 802 is radiated horizontally in both the left and right directions, only an optical path to the left is illustrated in FIG. 17. The tape end photodetecting element 930 using a light-receiving element is provided on the left side of the optical path. The shutter plate 925 is arranged before the element 930.

During insertion of the tray unit 100 into the housing performed after a cassette is loaded on the tray, a cassette detection mode is set. This mode can be switched as long as a control signal for rotating forward the motor 21 for driving the tray unit 100 is obtained in a system controller 803. If the shutter plate 925 is driven to output a detection signal, the controller 803 determines that the corresponding cassette is recordable, and turns on a display "F (front cassette), YES", for example, on the display unit 804. If no detection signal is obtained, a display "NO" is turned on.

Note that the state in which the cassette detecting lever 901 is located in the front region of the frame 101 has been described with reference to FIGS. 15A to 16C. However, a similar lug detecting lever is also provided in the back region of the frame to make it possible to detect the presence/absence of the safety lug of a cassette loaded on that region. Note, however, that the system is designed such that the front and rear lug detecting levers pass the position where the driving lever 922 is arranged, the function of the tape end detecting device is shared by the two levers. Therefore, if both cassettes are recordable, two detection signals are obtained. Note that in the embodiment shown in FIGS. 15A to 17, the data indicating the presence/absence of a cassette is finally converted into an electrical signal by the tape end detecting element 930 and supplied to the controller 803. However, an electric switching element may be arranged, in place of the shutter mechanism 920, below the locus of movement of the cassette detecting lever 901. In this arrangement, the switch is turned on/off in accordance with the position of the projection 904 of the cassette detecting lever 901, and an output from the switch is supplied to the controller 803. As a result, the presence/absence of a lug of a cassette can be detected with a simple structure. This system can be similarly applied to a VTR for handling only one cassette.

This system is also equipped with a means for not only detecting loading of a cassette but also storing the loading position of a cassette on the tray unit and using this stored data.

Figure 18A:
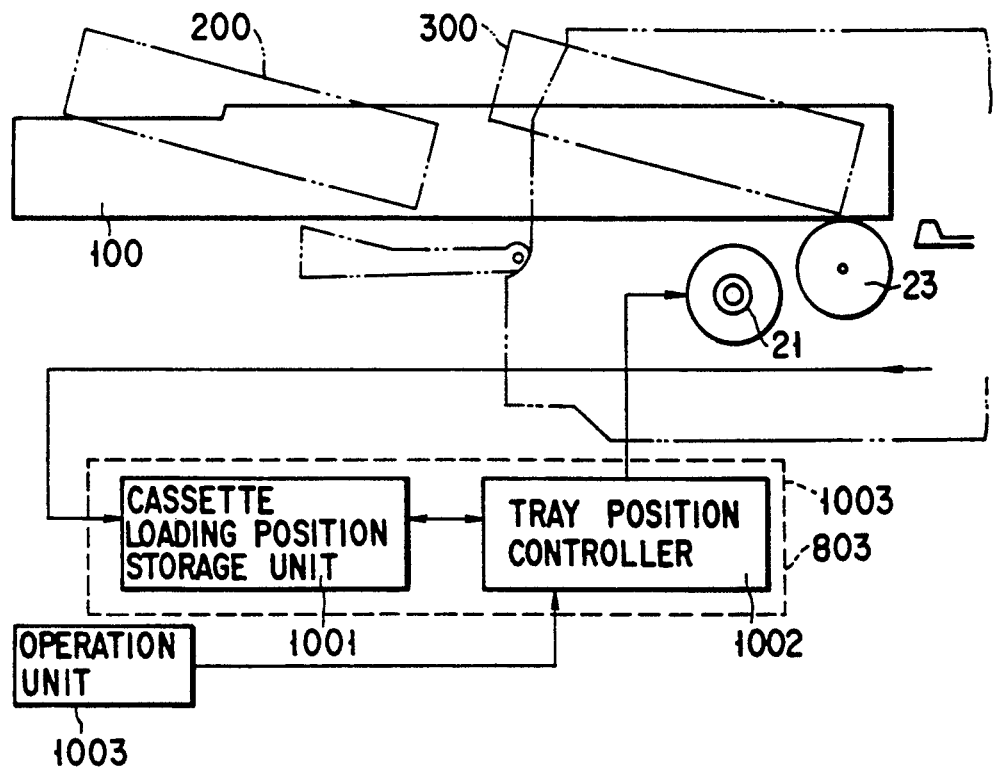
FIG. 18A is a view showing the arrangement of a tray controller associated with cassette detection data in the present invention.
Figure 18B:
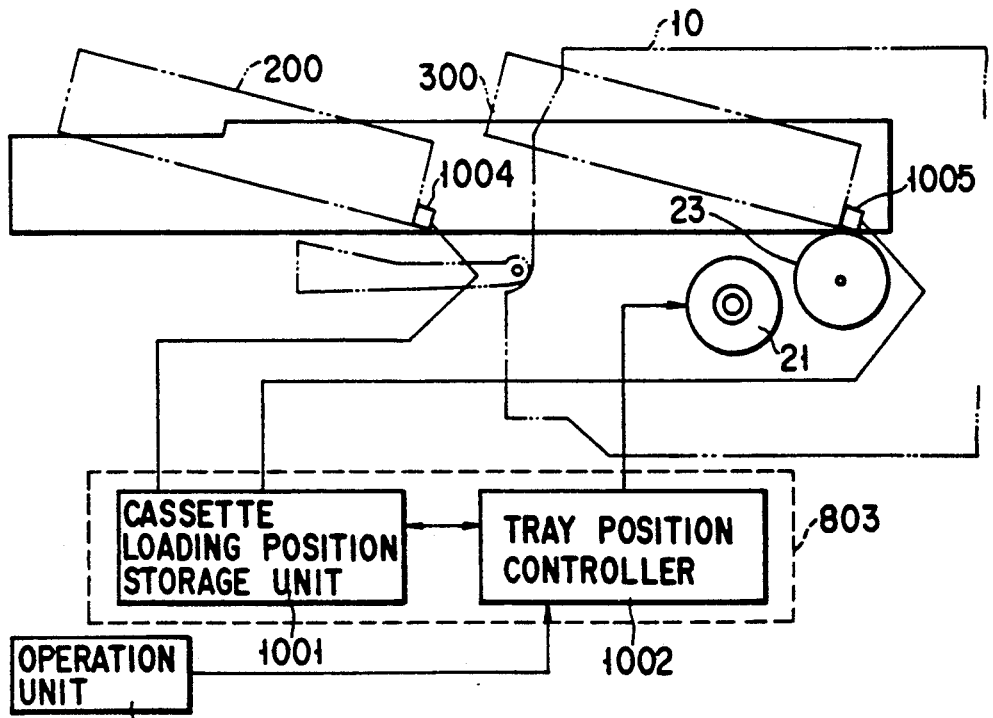
FIG. 18B is a view for explaining the arrangement of the cassette detecting apparatus according to another embodiment of the present invention.

FIGS. 18A and 18B show in more detail the interior of the system controller 803 which uses cassette data. As described above with reference to FIG. 17, cassette detection data at the respective regions of the tray are stored in a cassette loading position storage unit 1001. A tray position controller 1002 can read out the cassette presence/absence data from the cassette loading position storage unit 1001. The tray position controller 1002 receives a command signal for designating recording or reproduction from an operation unit 1003. If neither the front nor rear cassette are designated, an operation for automatically placing a cassette in the driving position is started when a predetermined time has elapsed. The tray position controller 1002 determines a region where the cassette is present in accordance with data from the cassette loading position storage unit 1001, and moves the tray unit 100 such that the cassette is located above the driving position. This control is performed because a region where no cassette is loaded is present in a system in which a plurality of cassettes are loaded on a tray unit. If cassettes are loaded in all regions, the processing is performed in a predetermined priority order of the cassettes. A means for moving a cassette located above the driving position downward is the pantograph mechanism.

FIG. 18A shows an arrangement using the data from the cassette detecting means described above with reference to FIGS. 15A to 16C. However, FIG. 18B shows an arrangement in which cassette detection signals are supplied to the cassette loading position storage unit 901 directly from the front and back regions of the tray unit 100. In this arrangement, optical or electrical detection switches are arranged as cassette detecting elements 1004 and 1005 in the respective regions.

As described above, the operation of causing a cassette to wait above the driving position by controlling the position of the tray unit 100 in the front-and-back direction is performed by referring to the cassette presence/absence data. As a result, it is possible to eliminate an unnecessary movement of the tray unit or to shorten a time required before recording or reproduction is started. This system is particularly effective in a VTR in which a plurality of cassettes can be placed on a tray unit in advance. In the above embodiment, when a predetermined time has elapsed after a command signal for designating a recording or reproducing operation, the tray unit 100 is controlled to move a region where a cassette is loaded to the position above the tape driving section. However, this control of movement may be started immediately after insertion of the tray unit 100 into the housing.

According to the present invention as has been described above, it is possible to determine the loading state of a cassette early to improve the reliability in handling, and to obtain an operation of loading a cassette in a tape driving section without any unnecessary movement.

What is claimed is:

1. A cassette data detecting apparatus of a system for loading a plurality of cassettes, said apparatus comprising:
   a housing incorporating means for performing a tape recording/reproducing function;
   an opening portion region defining an opening in a front wall of said housing;
   a tray unit disposed to be horizontally inserted and removed through said opening portion and having an upper surface on which cassettes are placed;
   lug detecting levers placed on said tray unit, and each having one end portion biased against a position of a safety lug of a respective one of the cassettes placed on said tray unit, a middle portion pivotably supported by said tray unit, and a second end portion which pivots at a first position when a cassette has a safety lug and pivots at a second position when a cassette has no safety lug; and
   lug detecting means for generating lug data when the other end portion of said lug detecting lever is located at the second position while said tray unit is moving to a standby position in said housing through said opening portion.

2. A cassette data detecting apparatus of a system for loading a plurality of cassettes, said apparatus comprising:
   a housing incorporating means for performing a tape recording/reproducing function;
   an opening portion region defining an opening in a front wall of said housing;
   a tray unit disposed to be horizontally inserted and removed through said opening portion and having an upper surface on which cassettes are placed;
   lug detecting levers placed on said tray unit, and each having one end portion biased against a position of a safety lug of a respective one of the cassettes placed on said tray unit, a middle portion pivotably supported by said tray unit, and a second end portion which pivots at a first position when a cassette has a safety lug and pivots at a second position when a cassette has no safety lug;
   a shutter mechanism which is driven when the second end portion of said lug detecting lever is located at the first position while said tray unit is moving to a standby position in said housing through said opening portion;
   photosensor means for generating a detection signal only when said shutter mechanism is driven to interrupt light incident thereon, said photosensor means normally serving as a tape end detecting element, and serving as means for detecting a state of said lug detecting lever by using said shutter mechanism while said tray unit is moving to the standby position in said housing through said opening portion; and means for fetching data indicating whether each of said cassettes placed on said tray unit is recordable in response to a signal output from said photosensor means while said tray unit is moving to the standby position in said housing through said opening portion.

3. A cassette data detecting apparatus of a system for loading a plurality of cassettes, said apparatus comprising:

a housing incorporating means for performing a tape recording/reproducing function;

an opening portion region defining an opening in a front wall of said housing;

a tray unit disposed to be horizontally inserted or removed through said opening portion and having an upper surface on which cassettes are placed;

cassette detecting levers placed on said tray unit, and each having one end portion biased against a position of a respective one of the cassettes placed on said tray unit, a middle portion pivotably supported by said tray unit, and a second end portion which pivots at a first position when a cassette has a safety lug which pivots at a second position when a cassette has no safety lug;

a shutter mechanism which is driven when the second end portion of said cassette detecting lever is located at the first position while said tray unit is moving to a standby position in said housing through said opening portion;

photosensor means for generating a detection signal only when said shutter mechanism is driven to interrupt light incident thereon, said photosensor means normally serving as a tape end detecting element, and serving as a means for detecting a state of said cassette detecting lever by using said shutter mechanism while said tray unit is moving to the standby position in said housing through said opening portion; and means for fetching data indicating whether each of said cassettes is placed on said tray unit in response to a signal output from said photosensor means while said tray unit is moving to the standby position in said housing through said opening portion.

4. A cassette loading apparatus of a system for loading a plurality of cassettes, said apparatus comprising:

a housing incorporating means for performing a tape recording/reproducing function;

an opening portion region defining an opening in a front wall of said housing;

a tray unit disposed to be horizontally inserted or removed through said opening portion and having upper surfaces of front and back regions on which at least first and second cassettes are placed;

cassette detecting and storing means for detecting whether a cassette is placed on each region of said tray unit and storing cassette presence/absence data for each region; and tray position control means for referring to the cassette presence/absence data stored in said cassette detecting and storing means and moving said tray unit forward or backward to set in a standby state so that one of said regions, in which a cassette is present and which has a high priority order, is located above a tape driving section at a predetermined position.

5. A cassette data detecting apparatus of a system for loading a plurality of cassettes, said apparatus comprising:

a housing which incorporates a recording and reproducing unit including a tape driving section;

an opening portion region defining an opening in a front wall of said housing;

a carrying unit having a first cassette housing section in which a first cassette is placed and a second cassette housing section in which a second cassette is placed;

a driving unit of said carrying unit, which moves said carrying unit between a first position where said cassettes are placed in said housing sections through said opening portion and a second position where said cassettes are transported to said tape driving section;

a cassette driving unit for transporting a cassette, which is moved by said driving unit of said carrying unit to a position at which said cassette is disposed to be transported to said tape driving section, between the position and said tape driving section; and lug detecting means for detecting the presence/absence of a safety lug of a cassette placed in said housing section when said carrying unit is located between the first and second positions.

6. A cassette data detecting apparatus of a system for loading a plurality of cassettes, said apparatus comprising:

a housing which incorporated a recording and reproducing unit including a tape driving section;

an opening portion region defining an opening in a front wall of said housing;

a carrying unit having a first cassette housing section for receiving a first cassette and a second cassette housing section for receiving a second cassette;

a driving unit of said carrying unit for moving said carrying unit between a first position where said first and second housing sections are disposed to receive said first and second cassettes, respectively, through said opening and a second position where said cassettes can be transported to said tape driving section;

a cassette driving unit for transporting a cassette, which is moved by said driving unit of said carrying unit to a position at which said cassette is disposed to be transported to said tape driving section, between the position and said tape driving section; and detecting means for detecting whether a cassette is placed in said housing section when said carrying unit is located between the first and second positions.

* * * * *